United States Patent
Bullock

(10) Patent No.: US 10,132,911 B1
(45) Date of Patent: Nov. 20, 2018

(54) CARGO RESTRAINT WITH RF BEACON

(71) Applicant: Matthew Bullock, McLean, VA (US)

(72) Inventor: Matthew Bullock, McLean, VA (US)

(*) Notice: Subject to any disclaimer, the term of this patent is extended or adjusted under 35 U.S.C. 154(b) by 0 days.

(21) Appl. No.: 15/670,506

(22) Filed: Aug. 7, 2017

Related U.S. Application Data

(63) Continuation-in-part of application No. 15/600,422, filed on May 19, 2017.

(51) Int. Cl.
| | |
|---|---|
| *G01S 1/68* | (2006.01) |
| *B60P 7/06* | (2006.01) |
| *B60P 7/08* | (2006.01) |
| *B60P 7/15* | (2006.01) |
| *B60P 7/14* | (2006.01) |

(52) U.S. Cl.
CPC ............ *G01S 1/68* (2013.01); *B60P 7/065* (2013.01); *B60P 7/0807* (2013.01); *B60P 7/0823* (2013.01); *B60P 7/0892* (2013.01); *B60P 7/14* (2013.01); *B60P 7/15* (2013.01)

(58) Field of Classification Search
None
See application file for complete search history.

(56) References Cited

U.S. PATENT DOCUMENTS

| | | | | |
|---|---|---|---|---|
| 1,850,597 A | * | 3/1932 | McGuire | B61D 45/003 410/48 |
| 3,595,177 A | * | 7/1971 | Bennett | B61D 39/001 105/377.09 |
| 4,079,677 A | | 3/1978 | Vandergriff et al. | |
| 4,880,342 A | | 11/1989 | Pradovic | |
| 5,080,950 A | | 1/1992 | Burke | |
| 5,127,525 A | * | 7/1992 | Hummer | B65D 5/5035 206/586 |
| 5,336,027 A | * | 8/1994 | Paddock | B60P 7/12 105/377.01 |
| 5,595,315 A | * | 1/1997 | Podd | B65D 90/047 220/1.5 |
| 6,089,802 A | | 7/2000 | Bullock | |
| 6,152,664 A | * | 11/2000 | Dew | B60P 7/0876 410/100 |

(Continued)

OTHER PUBLICATIONS

Yunzi Beacon User Manual, downloaded on May 11, 2017, from <https://www.sensoro.com/static/yunzi-specs-en.pdf> 13 pages.

(Continued)

*Primary Examiner* — Fekadeselassie Girma
(74) *Attorney, Agent, or Firm* — Banner & Witcoff, Ltd.

(57) ABSTRACT

A cargo restraint component such as a cargo restraint panel or a component of a load restraint strip system (e.g., a connecting strip or a load restraint strip) may comprise an attached RF beacon. Additional non-limiting examples of cargo restraint components that can comprise an attached RF beacon include a fluid filled member (e.g. an inflatable air bag), a layered structure (e.g. cardboard dunnage material with an internal honeycomb structure), a cargo retaining strap, a bracing member, a portable bulkhead, an non-skid mat, and an expandable load stabilizer. An RF beacon attached to a cargo restraint component can be configured to transmit identifying data. In some embodiments, an RF beacon attached to a cargo restraint component may include one or more sensors that can measure one or more environmental parameters.

17 Claims, 34 Drawing Sheets

(56) References Cited

U.S. PATENT DOCUMENTS

| | | | |
|---|---|---|---|
| 6,206,623 B1 | 3/2001 | Podd | |
| 6,227,779 B1 | 5/2001 | Bullock | |
| 6,422,794 B1* | 7/2002 | Zhan | B60P 7/0823 410/100 |
| 6,494,651 B1* | 12/2002 | Zhan | B60P 7/0815 410/106 |
| 6,585,466 B2* | 7/2003 | Zhan | B60P 7/0815 410/106 |
| 6,607,337 B1* | 8/2003 | Bullock | B60P 7/0823 410/34 |
| 6,619,213 B2* | 9/2003 | Militaru | B61D 3/16 105/404 |
| 6,626,625 B2 | 9/2003 | Nelson et al. | |
| 6,702,532 B1* | 3/2004 | Throener | B60P 7/0892 410/121 |
| 6,709,209 B2* | 3/2004 | Zhan | B60P 7/0815 410/106 |
| 6,758,644 B1* | 7/2004 | Vick | B60P 7/0823 24/68 CD |
| 6,896,457 B2* | 5/2005 | Halliar | B60P 7/12 410/36 |
| 6,896,459 B1 | 5/2005 | Bullock | |
| 6,923,609 B2 | 8/2005 | Bullock | |
| 6,981,827 B2 | 1/2006 | Bullock | |
| 7,018,151 B2 | 3/2006 | Bullock | |
| 7,066,698 B2 | 6/2006 | Bullock | |
| 7,214,014 B2* | 5/2007 | Stanley | B60P 7/0823 410/100 |
| 7,290,969 B2* | 11/2007 | Bullock | B60P 7/0823 410/118 |
| 7,306,415 B2* | 12/2007 | Halliar | B60P 7/12 410/77 |
| 7,322,781 B2 | 1/2008 | Bullock | |
| 7,329,074 B2 | 2/2008 | Bullock | |
| 7,482,924 B1* | 1/2009 | Beinhocker | G08B 13/186 250/227.14 |
| 7,604,443 B2 | 10/2009 | Bullock | |
| 7,628,572 B2 | 12/2009 | Kanczuzewski et al. | |
| 7,692,541 B1* | 4/2010 | Arcaini | B65D 90/008 340/545.6 |
| 8,113,752 B2 | 2/2012 | Bullock | |
| 8,128,324 B2 | 3/2012 | Bullock | |
| 8,287,216 B2* | 10/2012 | Frett | B61D 45/001 410/100 |
| 8,403,607 B1 | 3/2013 | Bullock | |
| 8,403,608 B1 | 3/2013 | Bullock | |
| 8,403,609 B1 | 3/2013 | Bullock | |
| 8,408,852 B1* | 4/2013 | Bullock | B60P 7/15 410/118 |
| 8,419,329 B1* | 4/2013 | Bullock | B60P 7/0823 410/118 |
| 8,888,424 B1* | 11/2014 | Bullock | B60P 7/135 410/118 |
| 8,979,449 B2 | 3/2015 | Bullock | |
| 9,090,194 B1 | 7/2015 | Bullock | |
| 9,333,899 B1* | 5/2016 | Bullock | B60P 7/16 |
| 9,371,168 B1* | 6/2016 | Rick | B65D 77/0413 |
| 9,481,512 B2* | 11/2016 | Diniaco | B65D 90/0073 |
| 2003/0206782 A1* | 11/2003 | Toglia | B60P 7/0884 410/94 |
| 2005/0052047 A1* | 3/2005 | McMahon | B60R 13/01 296/39.1 |
| 2005/0246057 A1* | 11/2005 | Olin | B64C 1/20 700/213 |
| 2005/0246132 A1* | 11/2005 | Olin | B64C 1/20 702/174 |
| 2006/0054705 A1* | 3/2006 | Garton | G06Q 10/08 235/485 |
| 2006/0119484 A1* | 6/2006 | Chishima | G01F 23/284 340/612 |
| 2006/0257224 A1* | 11/2006 | Bullock | B60P 7/0823 410/97 |
| 2008/0202402 A1* | 8/2008 | Giles | B63J 99/00 114/72 |
| 2008/0245791 A1* | 10/2008 | Atherton | B65D 5/4233 220/200 |
| 2008/0284567 A1* | 11/2008 | Portier | B65D 81/266 340/10.1 |
| 2009/0015400 A1* | 1/2009 | Breed | B60C 11/24 340/539.22 |
| 2009/0120823 A1* | 5/2009 | Seagle | B65D 19/0018 206/386 |
| 2010/0012653 A1* | 1/2010 | Ulrich | B65D 79/02 220/1.5 |
| 2010/0047032 A1* | 2/2010 | Funk | B60P 7/065 410/155 |
| 2010/0172710 A1* | 7/2010 | Frett | B61D 45/001 410/98 |
| 2010/0191615 A1* | 7/2010 | Thomas | B61D 3/20 705/26.1 |
| 2010/0219252 A1* | 9/2010 | Kikuchi | G06K 19/07749 235/488 |
| 2011/0226655 A1* | 9/2011 | Seagle | B65D 19/18 206/521 |
| 2012/0235815 A1* | 9/2012 | Coveley | G06K 19/07749 340/545.6 |
| 2013/0015192 A1* | 1/2013 | Seagle | B65D 19/18 220/592.01 |
| 2013/0033381 A1* | 2/2013 | Breed | B60T 1/005 340/568.1 |
| 2013/0314244 A1* | 11/2013 | Hershberger | G01D 4/002 340/870.02 |
| 2014/0190976 A1* | 7/2014 | Imbrecht | B65D 19/18 220/592.01 |
| 2015/0332142 A1* | 11/2015 | Coveley | G08B 13/126 235/492 |
| 2016/0082875 A1 | 3/2016 | Squyres | |
| 2017/0024989 A1* | 1/2017 | Coveley | B65D 55/02 |
| 2017/0096295 A1* | 4/2017 | Pherson | B64D 9/00 |
| 2017/0113863 A1* | 4/2017 | Cline | B65D 19/10 |
| 2018/0046833 A1* | 2/2018 | Havas | G06K 7/10386 |
| 2018/0060622 A1* | 3/2018 | Pilzner | G06K 19/07773 |

OTHER PUBLICATIONS

Hybertone, VOIP GSM Gateway, Overview, downloaded on May 11, 2017, from <http://www.hybertone.com/uploadfile/download/20121204135114733.pdf>, 1 page.

Shenzhen HyberTone Technology Co., Ltd., GOIP User Manual, VOIP GSM Gateways, Revision: 1.5, Jun. 24, 2016, downloaded on May 11, 2017, from <http://www.hybertone.com/uploadfile/download/20140304130029308.pdf>, 59 pages.

About Beacons/LogisticsBeacon-Logistics Beacon, "What are Beacons?", downloaded on May 11, 2017, from <http://www.logisticsbeacon.com/about-beacons.html>, 3 pages.

Amazon Page For GSM BT Gateway, GSM VOIP Gateway GOIP-1 Support Asterisk, Trixbox, 3CX, SIP Proxy Server, Voip Buster, downloaded on May 11, 2017, from <https://www.amazon.com/Gateway-GOIP-1-Support-Asterisk-Trixbox/dp/B00L11NO5U/ref=pd_lpo_vtph_229_bs_lp_img_2?_encoding=UTF8&psc=1&r . . . >, 6 pages.

Beacon Hardware/LogisticsBeacon-Logistics Beacon, SmartBeacon—4AA Pro by Sensoro, downloaded on May 11, 2017, from <http://www.logisticsbeacon.com/beacon-hardware.html>, 2 pages.

How They Work/LogisticsBeacon—Logistics Beacon, Logistics Beacons in Action, downloaded on May 11, 2017, from <http://www.logisticsbeacon.com/how-they-work.html>, 3 pages.

Industries/LogicsBeacon—Logistics Beacon, Solutions Designed for Your Unique Business Needs, downloaded on May 11, 2017, from <http://www.logisticsbeacon.com/industries.html>, 3 pages.

Logisiticsbeacon, Beacon Information, SmartBeacon-4AA Pro, Powered by Sensoro, downloaded on May 11, 2017, from <http://www.logisticsbeacon.com/uploads/8/2/3/4/82343370/sensoro_beacon_3_pdf>, 1 pages.

Shenzhen Hybertone Technology Co., Ltd., Hypertone, Features Tab, Model: GOIP-1, downloaded on May 11, 2017, from <http://www.hybertone.com/en/pro_detail.asp?proid=10>, 3 pages.

(56) References Cited

OTHER PUBLICATIONS

Shenzhen Hybertone Technology Co., Ltd., Hybertone, Photo Gallery Tab, Model: GOIP-1, downloaded on May 11, 2017, from <http://www.hybertone.com/en/pro_detail.asp?proid=10>, 2 pages.

Shenzhen Hybertone Technology Co., Ltd., Hybertone, GSM VOIP Gateway, Model: GOIP-1, downloaded on May 11, 2017, at <http://www.hybertone.com/en/pro_detail.asp?proid=10>, 2 pages.

Sensoro SmartBeacon-4AA, Outlook, The SmartBeacon-4AA is built for commercial deployment., downloaded on May 11, 2017, from <http://www.sensoro.com/static/SmartBeacon_4AA.pdf>, 12 pages.

Web page of Sunrise Manufacturing <http://www.sunrise.mfg.com/>, first accessed prior to Aug. 7, 2017.

Web page of Sunrise Manufacturing for air bags <http://www.sunrisemfg.com/air-bags>, first accessed prior to Aug. 1, 2017.

Web page of Sunrise Manufacturing for collapsible void fillers <http://www.sunrisemfg.com/collapsible-void-fillers>, first accessed prior to Aug. 7, 2017.

Web page of Sunrise Manufacturing for void tiller panels <http://www.sunfirsemfg.com/void-filler-panels>, first accessed prior to Aug. 7, 2017.

Web page of Sunrise Manufacturing for additional freight protection products <http://www.sunrisemfg.com/addtional-freight-protection-products>, first accessed prior to Aug. 7, 2017.

Web page of GoDunnage for dunnage air bags <https://www.godunnage.com/Category/Air-Bags>; first accessed prior to Aug. 7, 2017.

Product literature for G-Force® "fill" products; Aug. 2014.

Product literature for G-Force® "brace" products; Aug. 2014.

Product literature for G-Force® "stack" products; Aug. 2014.

Product literature for G-Force® Load Securement Innovations—Utilized Goods in Boxcars; Aug. 2014.

Product literature for G-Force® Load Securement Innovations—Utilized Goods in Intermodal Containers; Aug. 2014.

Product literature for G-Force® Load Securement Innovations—Utilized Goods in Intermodal Containers and Over-the-Road Trailers; Aug. 2014.

Web page for Cordstrap Cargo Container Securing <http://www.cordstrap.com/en/Products/container-cargo-securing/>; first accessed prior to Aug. 7, 2017.

Southern Bracing Systems web page for Ty-Cord® Strapping System <https://www.cordstrap.com/en/Products/container-carg-securing/>; first accessed prior to Aug. 7, 2017.

Logistick web page for "Loadbar Wide®" <https://www.logistick.com/product/loadbar-wide/>; first accessed prior to Aug. 7, 2017.

Web Page titled "corrugated cardboard bulkheads"; first accessed prior to Aug. 7, 2017.

* cited by examiner

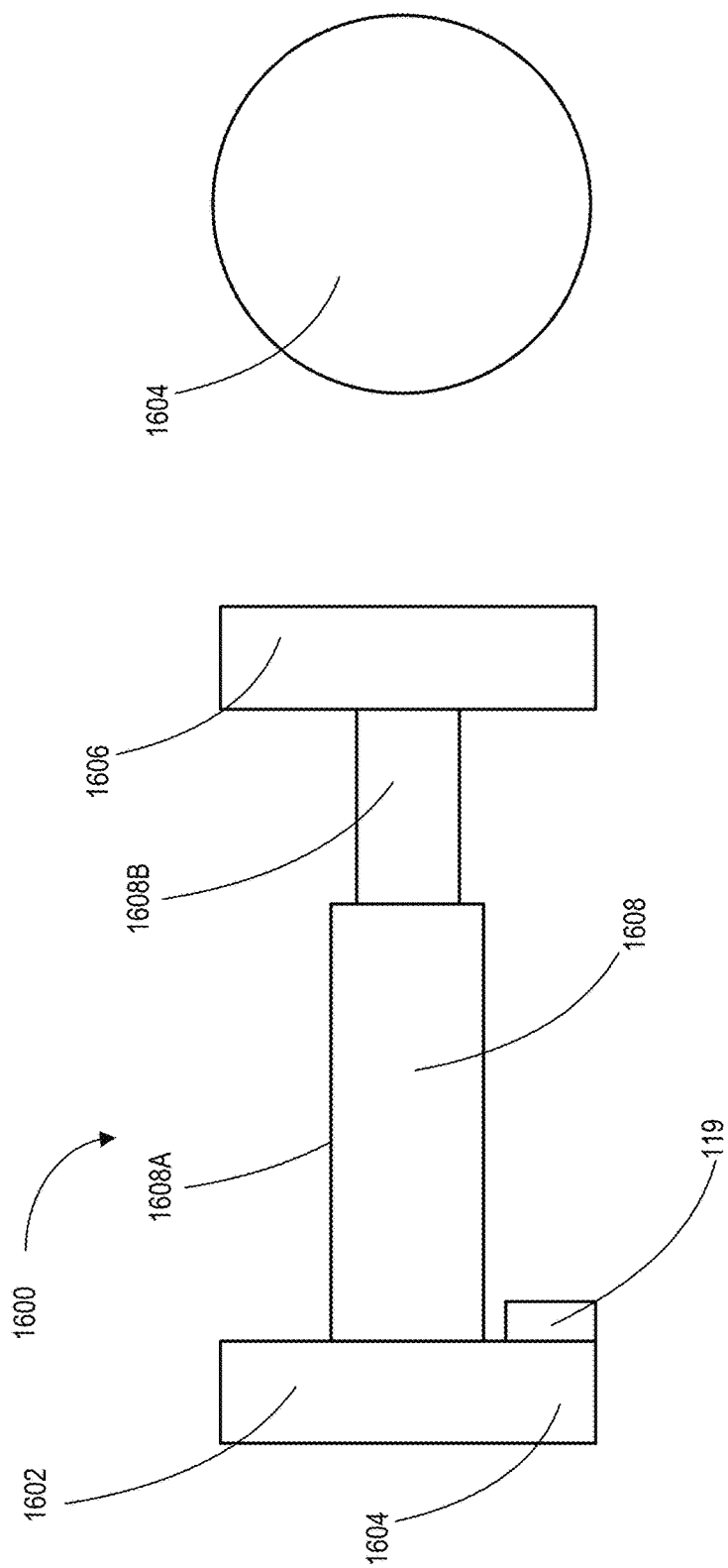

CARGO RESTRAINT WITH RF BEACON

CROSS-REFERENCE TO RELATED APPLICATION

This application is a continuation-in-part of U.S. application Ser. No. 15/600,422 filed on May 19, 2017. This above referenced application is incorporated by reference in its entirety.

BACKGROUND

Various types of components can be used to restrain cargo for shipment. These components are designed to secure cargo so as to prevent shifting during transport, which shifting could damage the cargo or the vessels used for transport. Some types of cargo restraint components may also provide cushioning and other protection. Typically, however, cargo restraining components have not been used for monitoring or tracking purposes.

SUMMARY

This Summary is provided to introduce a selection of concepts in a simplified form that are further described below in the Detailed Description. This Summary is not intended to identify key features or essential features of the invention.

A cargo restraint component such as a cargo restraint panel or a component of a load restraint strip system (e.g., a connecting strip or a load restraint strip) may comprise an attached RF beacon. Additional non-limiting examples of cargo restraint components that can comprise an attached RF beacon include a fluid filled member (e.g. an inflatable air bag), a layered structure (e.g. cardboard dunnage material with an internal honeycomb structure), a cargo retaining strap, a bracing member, a portable bulkhead, an anti-skid mat, and an expandable load stabilizer. An RF beacon attached to a cargo restraint component can be configured to transmit identifying data. In some embodiments, an RF beacon attached to a cargo restraint component may include one or more sensors that can measure one or more environmental parameters.

BRIEF DESCRIPTION OF THE DRAWINGS

Some embodiments are illustrated by way of example, and not by way of limitation, in the figures of the accompanying drawings and in which like reference numerals refer to similar elements.

FIGS. 37A and 37B are a front view and a side view, respectively, of an embodiment of a cargo restraint component that comprises an expandable load stabilizer.

DETAILED DESCRIPTION

In some embodiments, a cargo restraint panel may include a polymer foam component and an attached radio frequency (RF) beacon. The panel, together with other similar panels, may be placed between cargo units and/or between a cargo unit and a bulkhead of a cargo shipping container. Through such placement, those panels may restrain those cargo units and prevent their movement within the shipping container. The foam components of those panels may absorb shock when the shipping container experiences acceleration, thereby cushioning the cargo units and preventing damage. Each of the panel RF beacons may transmit one or more identification codes and/or other data. Non-limiting examples of other data that may be transmitted are provided herein. Monitoring stations located at various locations along a route of cargo transport may be used to monitor for those identification codes and/or for other data.

Figure 1A:
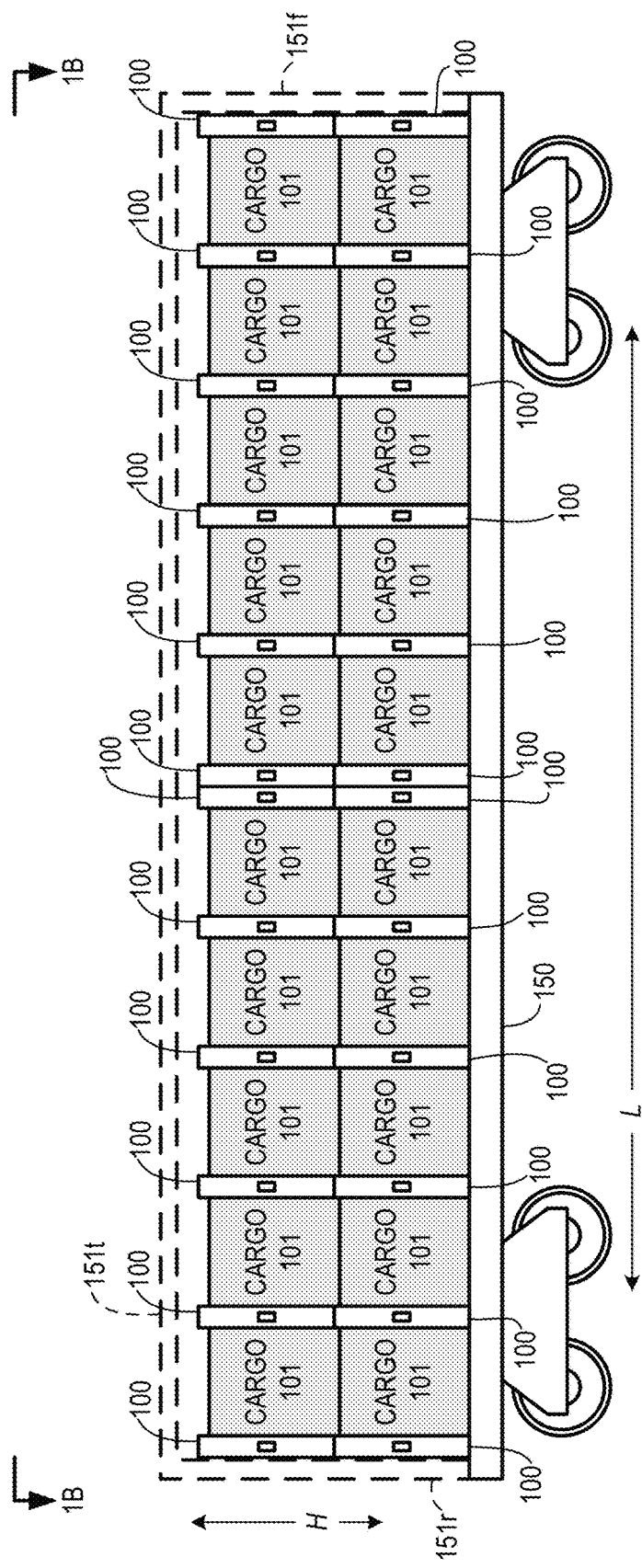
FIG. 1A is a side view of one example in which cargo restraint panels according to some embodiments have been used to secure cargo units in a cargo shipping container.
Figure 1B:
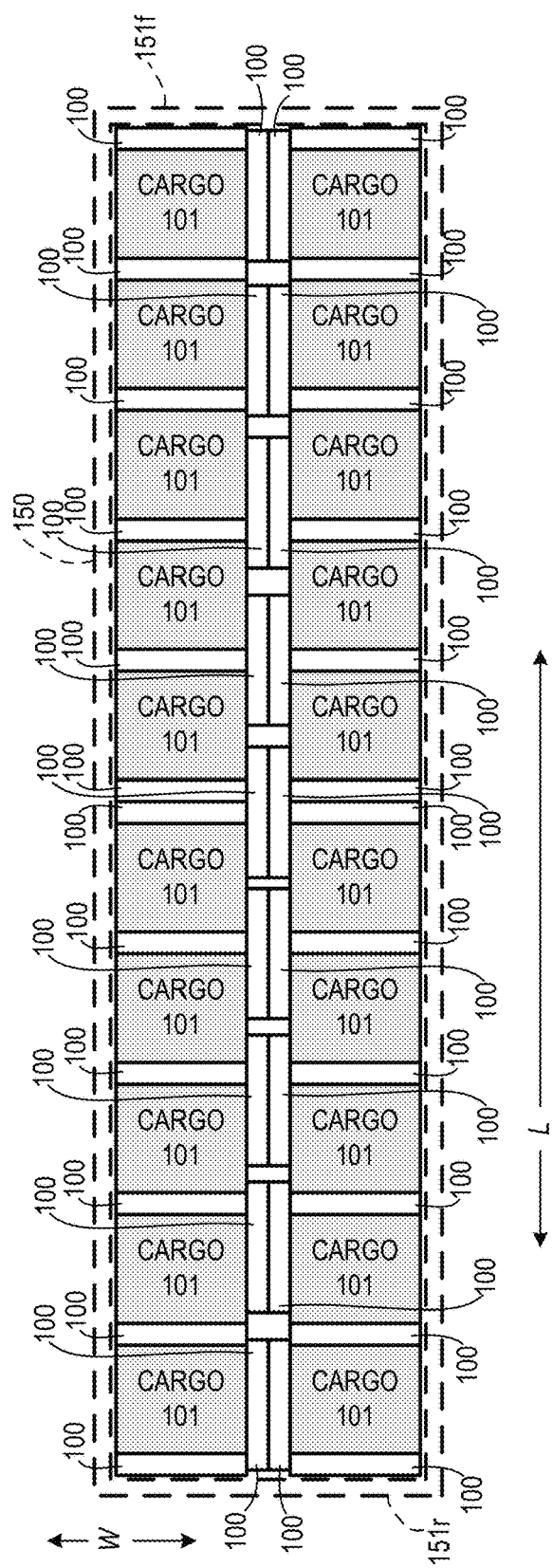
FIG. 1B is a top view from the location indicated in FIG. 1A.

Examples of cargo shipping containers include railcars, intermodal transport containers, semi trailers, and any other container in which one or more cargo units may be placed. FIG. 1A is a side view of one example in which cargo restraint panels 100 according to some embodiments have been placed between cargo units 101 and between cargo units 101 and a shipping container bulkhead. FIG. 1B is a top view from the location indicated in FIG. 1A. Cargo units 101 may represent any type of cargo that may be transported and for which restraint and protection against damage is desired. Although cargo units are shown as uniformly sized components in FIGS. 1A and 1B and in other drawings, cargo units in other embodiments may be non-uniformly sized and/or may be arranged in a different manner.

In the example of FIGS. 1A and 1B, the shipping container is a railcar 150. Front bulkhead 151*f*, rear bulkhead 151*r*, and top 151*t* are represented with broken lines. A length axis L, height axis H, and a width axis W are also indicated. Cargo units 101 and cargo restraint panels 100 are arranged in a front-to-rear direction in alternating groups of cargo restraint panels 100 and cargo units 101. Panels 100 are placed between cargo units 101, between cargo units 101 and the inside surface of front bulkhead 151*f*, and between cargo units 101 and the inside surface of rear bulkhead 151*r*. Cargo units 101 are restrained from movement in the direction of axis L by the presence of panels 100 and by the presence of other cargo units. In particular, each cargo unit 101 is restrained from movement along axis L by elimination of gaps between the front and rear of that cargo unit and the next object (e.g., another cargo unit, a panel 100, a bulkhead of rail car 150) along axis L.

The example of FIGS. 1A and 1B represents a single example of how cargo units and cargo restraint panels according to some embodiments may be placed in a cargo shipping container. In other examples, cargo units and cargo restraint panels may be arranged differently, but the cargo units may still be restrained from movement and cushioned. Such other examples include, without limitation, the following: placing multiple cargo units adjoining one another along axis L; placing cargo units directly contacting a bulkhead; placing cargo units and/or cargo restraint panels into contact with a moveable bulkhead that can be positioned and secured within a shipping container interior; using cargo restraint panels of different sizes; and using cargo restraint panels in conjunction with other forms of cargo restraint to secure cargo units.

Figure 2:
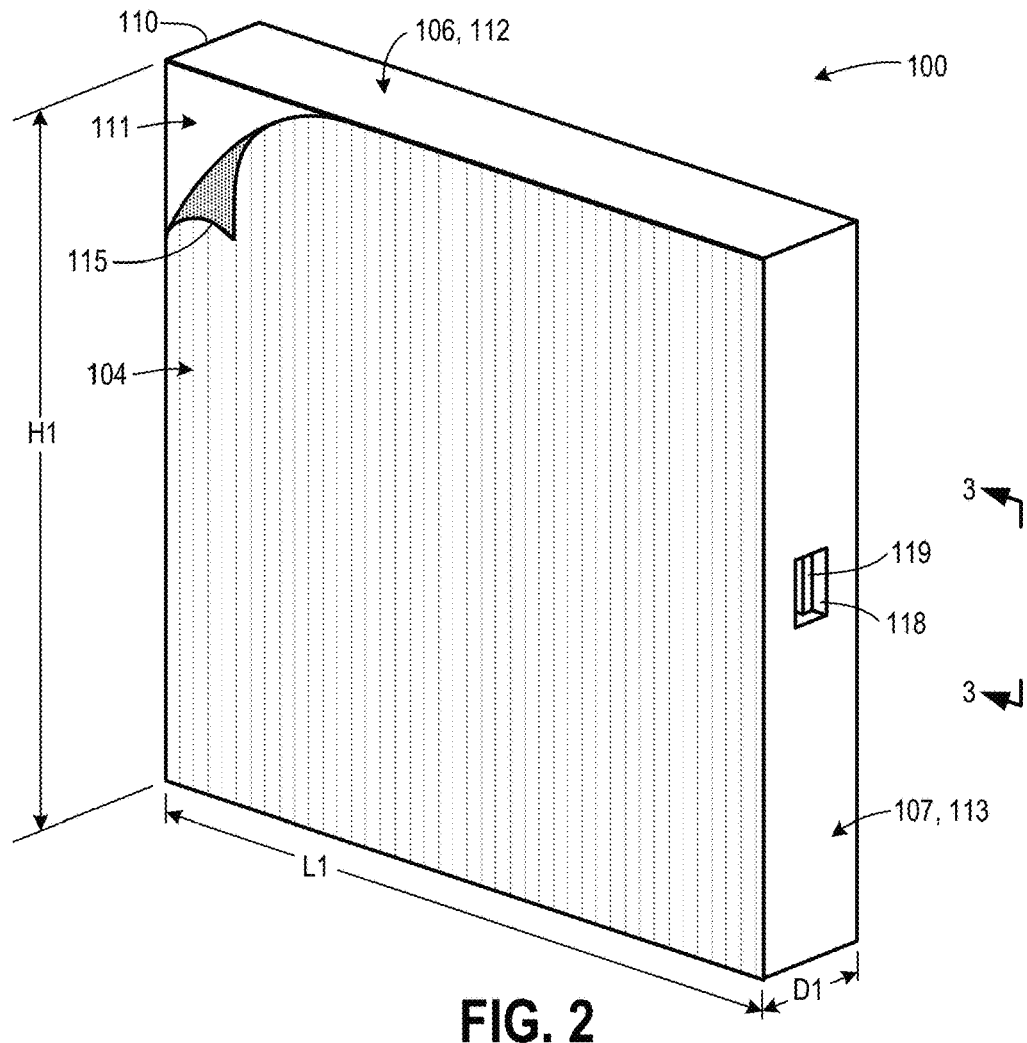
FIG. 2 is a front perspective view of a cargo restraint panel according to some embodiments.
Figure 3:
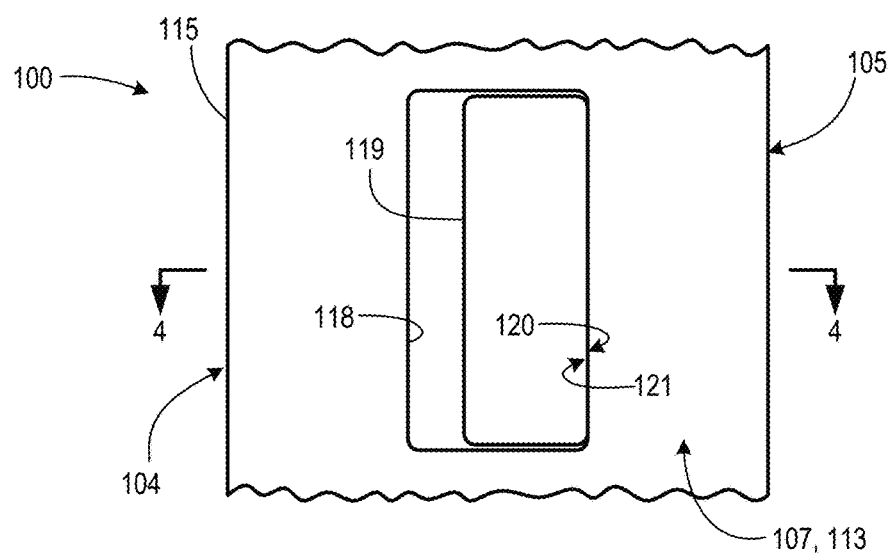
FIG. 3 is an enlarged partial side view from the location indicated in FIG. 2.

FIG. 2 is a front perspective view of a cargo restraint panel 100 according to some embodiments. FIG. 3 is an enlarged partial side view of cargo restraint panel 100 from the location indicated in FIG. 2. Panel 100 has a front face 104, a rear face 105, and a plurality of side faces that extend between front face 104 and rear face 105. Side faces 106 and 107 are visible in FIG. 2 and a portion of side face 107 is visible in FIG. 3.

Panel 100 includes a polymer foam component 110. Foam component 110 is formed from an expanded polymer foam such as expanded polystyrene (EPS). In some embodiments, and as shown in FIGS. 2 and 3, a foam component may be a single polymer foam sheet. In other embodiments, a foam component may comprise two or more polymer foam sheets that have been bonded together. Foam component 110 has a front face 111, an opposite rear face, and a plurality of side faces extending between the front and rear faces. Side faces 112 and 113 are visible in FIG. 2.

Front face 104 of panel 100 comprises a facing material 115 that is bonded to front face 111 of foam component 110. Rear face 105 comprises a similar facing material that is bonded to the rear face of foam component 110. Although a corner of facing material 115 is shown peeled away in FIG. 2 for purposes of illustration, in some embodiments a facing material may be permanently bonded to a foam component. A permanent bonding is a bonding in which the bonded elements cannot be separated without at least partially damaging or destroying one or both of the elements. As used herein, a first element is "bonded" to a second element when the first element is firmly fixed relative to the second element across most or all of the interface between those elements. Bonding can include adhesive attachment using glue. Bonding can also include fusion whereby one or both of the first and second elements, and/or other elements, solidify (e.g., after partial melting) so as to hold the first and second elements in a fixed relationship to one another. Bonding can be direct or indirect. For example, a first element and a second element could be indirectly bonded to one another by each being bonded to an intermediate third element.

In the embodiment of FIGS. 2 and 3, side faces of foam component 110 are not covered by a facing material. Thus, panel face 106 and foam component side face 112 are the same, as are panel face 107 and foam component side face 113, as well as the other two pairs of panel 100 and foam component 110 side faces not visible in FIGS. 2 and 3. In other embodiments, one, some, or all side faces of a cargo restraint panel may include a facing material.

As seen in FIG. 2, and as seen in further detail in FIG. 3, a pocket 118 is formed in side face 107 of panel 100. Situated within pocket 118 is RF beacon 119. RF beacon 119 is attached to panel 100. In particular, a face 120 of a housing of RF beacon 119 is bonded to a face 121 of pocket 118. As explained in more detail below, RF beacon 119 includes a battery, processor, memory, and a transceiver and is configured to repeatedly transmit one or more identification codes. In some embodiments, RF beacon 119 may further include one or more sensors that are configured to measure environmental parameters. Non-limiting examples of environmental parameters that may be measured by an RF beacon sensor according to some embodiments include temperature, acceleration, and humidity.

In some embodiments, cargo restraint panel may have a height H1 of at least 4 feet, a length L1 of at least 4 feet, and a depth D1 of at least 6 inches. These dimensions are only one example, however. Embodiments include cargo restraint panels have larger or smaller depth dimensions and/or larger or smaller height dimensions and/or larger or smaller length dimensions.

Figure 4:
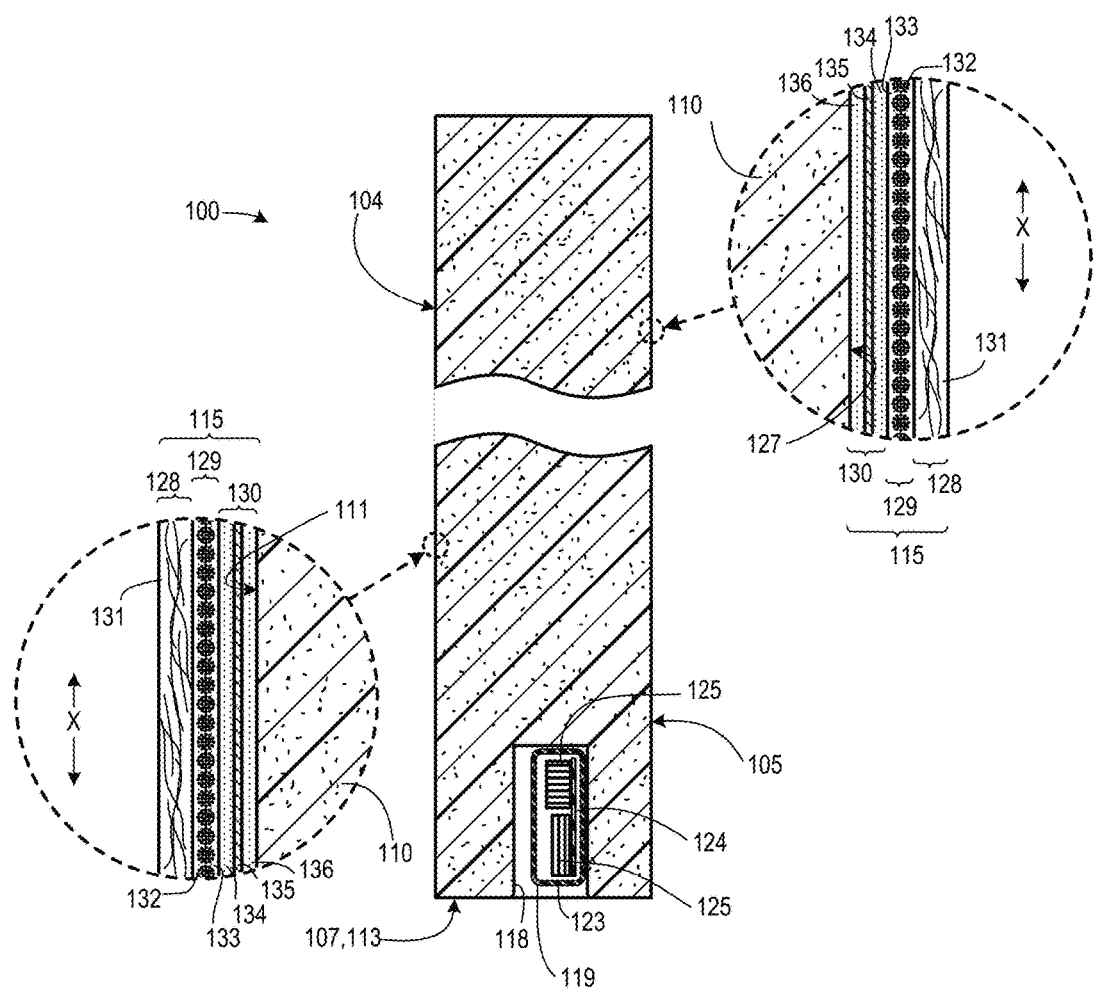
FIG. 4 is a partially schematic area cross-sectional view taken from a sectioning plane having the location indicated in FIG. 3.

FIG. 4 is a partially schematic area cross-sectional view of cargo restraint panel 100 taken from a sectioning plane having the location indicated in FIG. 3. Wave-shaped notations are added to FIG. 4 to schematically indicate portions of panel 100 have been omitted from the drawing for convenience, but that do not represent an actual interruption in the structure of panel 100. As shown generically in FIG. 4, RF beacon 119 may include a housing 123 that holds a printed circuit board 124 with one or more electronic components 125 mounted thereon. Further details regarding the structure of RF beacons according to some embodiments are provided below in connection with FIG. 8. Actual components of an RF beacon can be selected by persons of ordinary skill in the art based on the disclosure provided herein.

Enlargements (in large broken line circles) at the left and right sides of FIG. 4 show the structure of facing material 115 according to some embodiments. As seen in FIG. 2, facing material 115 on front face 104 of cargo restraint panel 100 covers the entire front face 111 of foam component 110. The left-side enlargement of FIG. 4 shows details of the structure of facing material 115 on front face 104 of cargo restraint panel 100. The structure shown in the left-side enlargement may be representative of the entire front face 104. Facing material 115 on rear face 105 of panel 100 covers an entire rear face 127 of foam component 110. The right-side enlargement of FIG. 4 shows details of the structure of facing material 115 on rear face 104 of cargo restraint panel 100. The structure shown in the right-side enlargement may be representative of the entire rear face 105.

Facing material 115 comprises a base layer 128, a reinforcement layer 129, and an attachment layer 130. Base layer 128 includes a sheet 131 of base layer material. Sheet 131 may be, e.g., a continuous piece of spun bonded polyethylene fiber material. Examples of such material includes the product sold under the trade name TYVEK. Examples of other base layer materials include bands of other types of spun bonded polymer fibers, films of polyester, polyethylene terephthalate (e.g., such as films sold under the trade name MYLAR) or other polymers, paper, bands of woven, knitted or felted natural fibers (e.g., cotton), and bands of woven or knitted artificial fibers. Embodiments also include cargo restraint panels having a facing material that lacks a layer such as base layer 128, and/or in which a reinforcement layer is directly bonded to a foam component face in another manner.

Reinforcement layer 129 is fixed relative to base layer 128. In particular, reinforcement fibers 132 are bonded to a side of sheet 131 by a laminating adhesive 133. In some embodiments, fibers 132 are parallel to one another and may extend from one edge of a panel face to an opposite edge. In some embodiments, fibers 132 are bundles of polymer strands having a denier (i.e., a linear mass density in grams per 9000 meters) of between about 1400 and about 1650. In some embodiments, there may be between 5 and 25 fibers 132 per inch in a direction perpendicular to the fibers. That direction is labeled "X" in FIG. 4. Exemplary materials for the strands of fibers 132 include polyester. Laminating adhesive 133 may be, e.g., an ethylene vinyl acetate water based copolymer adhesive. Attachment layer 130 is fixed relative to reinforcement layer 129 and relative to face 111 or face 127 of foam component 110. In some embodiments, attachment layer 130 may comprise a first adhesive layer 134, a second adhesive layer 136 and a substrate layer 135. Substrate layer 135 at least partially separates adhesive layers 134 and 136. In some embodiments, however, substrate layer 135 may include holes or other perforations permitting direct contact between adhesive layers 134 and 136 in certain regions, or may be completely absent. Adhesive layers 134 and 136 may comprise, e.g., an acrylic adhesive and substrate layer 135 may comprise a film of polyethylene terephthalate (PET) or other polymer.

Although cargo restraint panel 100 has facing material 115 applied to two faces, embodiments include cargo restraint panels having facing material on fewer, more, or all faces of a foam component. For example, facing material 115 could be applied to one or more of side face 112, side face 113, or other side faces of foam component 110 in a manner similar to the manner in which material 115 is applied to front face 111 and rear face 127. If applied to side face 107 in which pocket 118 is located, the facing material may partially cover the pocket in some embodiments so as to provide additional protection for RF beacon 119. The portion of the facing material covering the pocket may include perforations or other openings to allow ventilation. In some embodiments, facing material on a side face may be completely removed over a pocket opening. In some embodiments, a cargo restraint panel may comprise different types of facing material applied to different locations.

Figure 5:
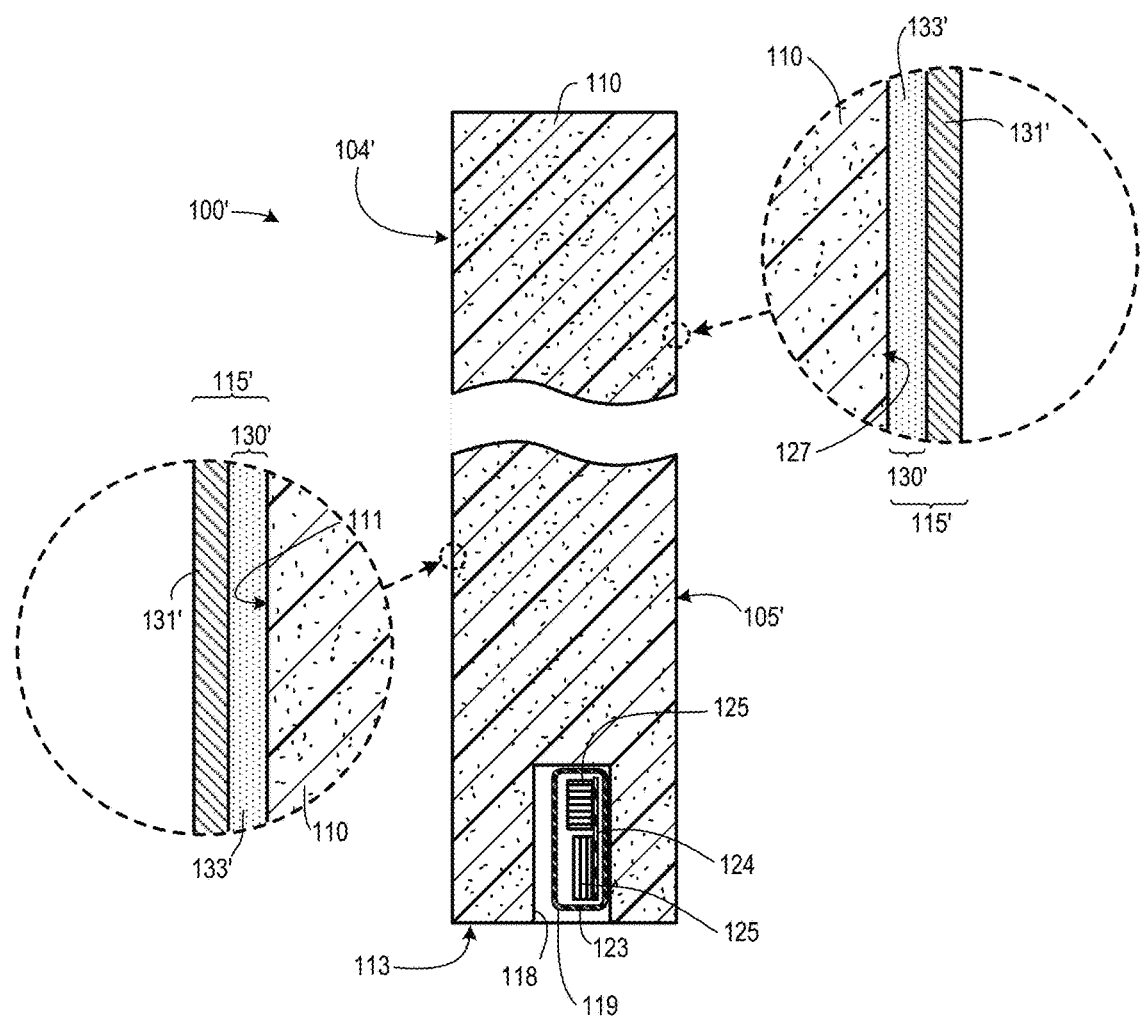
FIG. 5 is a partially schematic area cross-sectional view of a cargo restraint panel according to another embodiment.

FIG. 5 is a partially schematic area cross-sectional view of another cargo restraint panel 100' that includes a different facing material 115', but that is otherwise similar to panel 100 of FIGS. 2-4. The view of FIG. 5 is taken from a sectioning plane at a location similar to that indicated in FIG. 3 from which the view of FIG. 4 is taken. The left-side enlargement of FIG. 5 shows details of the structure of facing material 115' on front face 104' of cargo restraint panel 100'. The structure shown in the left-side enlargement may be representative of the entire front face 104'. Facing material 115' on rear face 105' of panel 100' covers rear face 127 of foam component 110. The right-side enlargement of FIG. 5 shows details of the structure of facing material 115' on rear face 105' of cargo restraint panel 100'. The structure shown in the right-side enlargement may be representative of the entire rear face 105'. Facing material 115' includes an adhesive later 130' that bonds a monolithic polymer sheet 131' to front face 111 or to rear face 127 of foam component 110. Sheets 131' may be polyethylene terephthalate or other flexible polymer material. The adhesive 133' of layer 130' may comprise an ethylene vinyl acetate water based copolymer adhesive, an acrylic adhesive, or some other type of adhesive.

Figure 6:
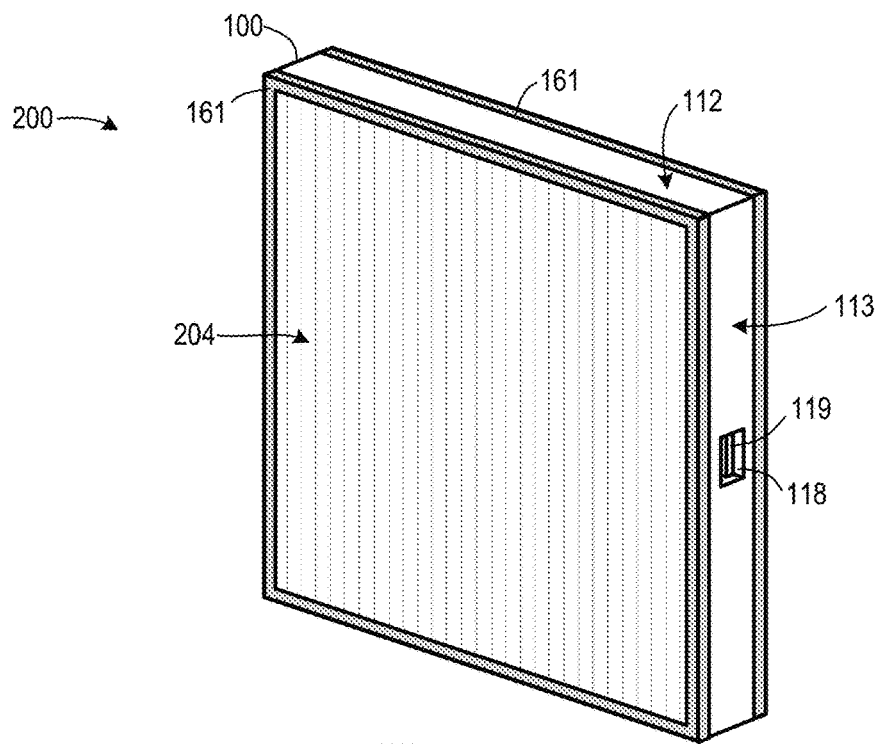
FIGS. 6 and 7 are front perspective views of cargo restraint panels according to additional embodiments.
Figure 7:
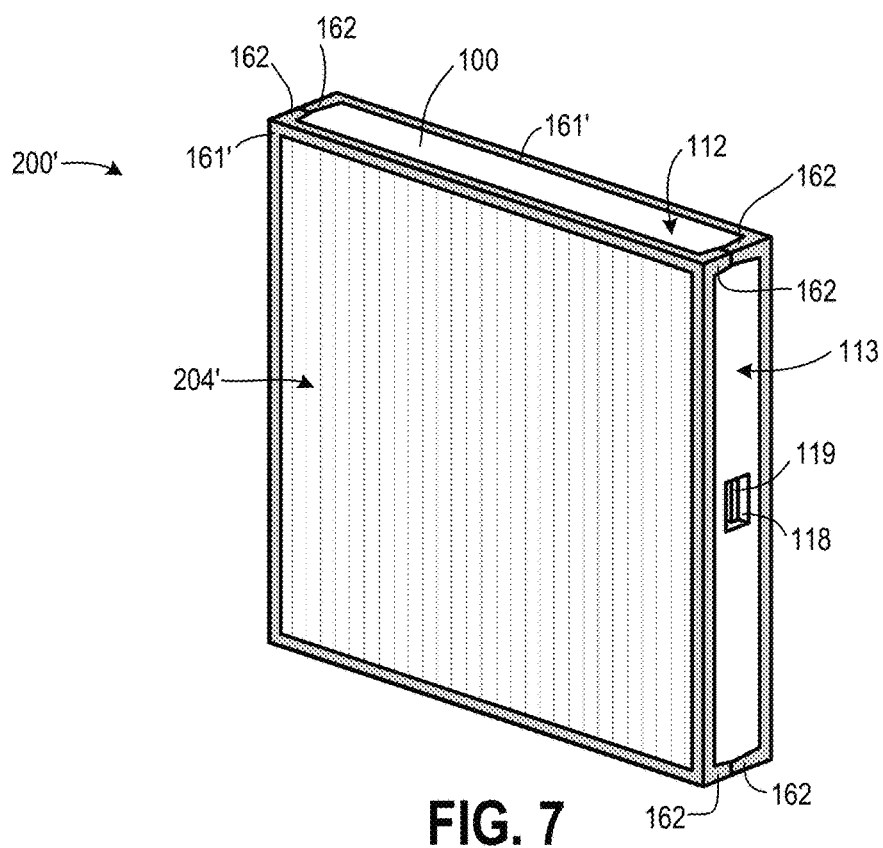

In some embodiments, and as shown in FIGS. 6 and 7, a cargo restraint panel may include edge guards attached to some or all edges of the panel front and rear faces. Panel 200 of FIG. 6 is similar to panel 100 and includes an RF beacon 119, but includes edge guards 161 on edges of front face 204 and on edges of the rear face. Panel 200' of FIG. 7 is similar to panel 100 and to panel 200 and also includes an RF beacon 119. However, the edge guards 161' of panel 200' include overlapping corner extensions 162 that extend over the corners formed by joining of side face edges. Edge guards and/or corner extensions may be formed of a material that is more rigid and less compressible than the polymer foam of the cargo restraint panel to which they are attached, and more rigid than a facing material on the face(s) of the panel.

In still other embodiments, a cargo restraint panel may be similar to any of the cargo restraint panels described in commonly-owned U.S. Pat. No. 9,333,899, but with an RF beacon attached. U.S. Pat. No. 9,333,899, in its entirety, is incorporated by reference herein.

Figure 8:
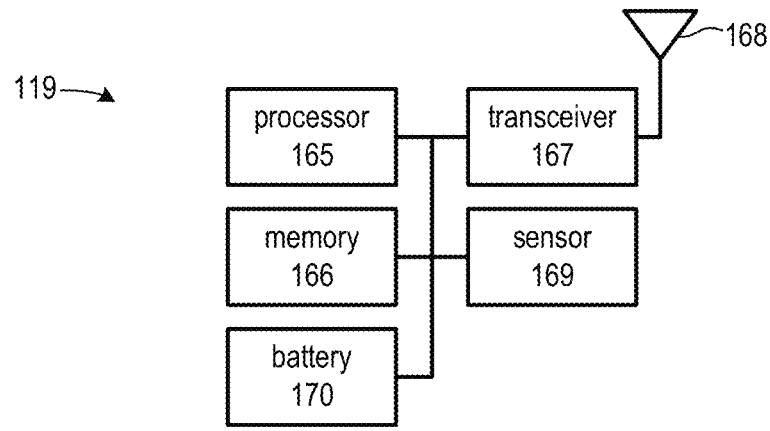
FIG. 8 is a block diagram showing components of an RF beacon according to some embodiments.

FIG. 8 is a block diagram showing components of RF beacon 119 according to some embodiments. RF beacon 119 may comprise one or more processors 165, one or more memories 166, one or more transceivers 167 having one or more antennas 168, one or more sensors 169, and one or more batteries 170. For convenience, the remaining discussion of RF beacon 119 will refer to a single processor, a single memory, a single transceiver, etc. In some embodiments, however, operations described in connection with a single component of RF beacon 119 could be carried out by and/or distributed across multiple instances of that component within a single RF beacon.

Processor 165 executes instructions stored by memory 166 and performs operations as a result of that execution. Those operations may include reading and writing data to memory 166, receiving data from sensor 169, comparing received data to a threshold and performing actions in response, causing transceiver 167 to transmit data via antenna 168, receiving data from transceiver 167 that was received via antenna 168, and/or other operations such as are described herein. Processor 165 may be a general purpose microprocessor programmed to perform operations described herein, an application specific integrated circuit (ASIC) specially configured to perform operations described herein, and/or other type of computational circuitry configured to perform operations such as are described herein.

Memory 166 stores data in a non-transitory manner. Memory 166 may be FLASH memory, RAM, or other type of known memory. Memory 166 is shown separately from processor 165 in FIG. 8 for convenience, but in some embodiments processor 165 and some or all of memory 166 may reside on the same chip.

Transceiver 167 comprises circuitry configured to receive data from processor 165 and transmit that data as modulated RF signals through antenna 168, as well as circuitry configured to receive modulated RF signals through antenna 168, demodulate those signals, and output resulting data to processor 165. Transceiver 167 is configured to transmit and receive RF signals according to one or more known protocols. In some embodiments, transceiver 167 operates in accordance with one or more BLUETOOTH® standards. In other embodiments, alternate communication protocols are used. Numerous types of transceiver chips that operate according to BLUETOOTH® standards or according to other standards are known and commercially available.

As is known in the art, a transceiver comprises a transmitter and a receiver. In some transceivers, some or all components of the transceiver may alternately be used for transmitting operations and for receiving operations. Other transceivers may have a separate transmitter and receiver. Embodiments include RF beacons having either type of transceiver. Embodiments also include RF beacons which only have an RF transmitter and lack an RF receiver, and/or in which profile data (described below) may be received by a separate port (e.g., a micro USB port) or in some other way (e.g., a removable memory card). As used herein, a reference to transmitting, causing transmitting, and the like encompasses transmitting (or causing transmitting) through a transmitter that is part of a transceiver or through transmitter that is not part of a transceiver. Similarly, "transmitter" encompasses components of a transceiver configured to transmit, as well as transmitter that may not be part of a transceiver and/or that may be in a device that lacks a receiver.

Sensor 169 is configured to measure one or more environmental parameters and to output data indicative of the measurement. In some embodiments, the environmental parameter is acceleration. In other embodiments, the environmental parameter is temperature. In still other embodiments, the environmental parameter is humidity. Additional examples of environmental parameters that may be measured include, without limitation, light, atmospheric pressure, and moisture. Sensors to measure acceleration, temperature, humidity, light, atmospheric pressure, moisture, and other environmental parameters are known and commercially available.

Battery 170 provides power to the other components of RF beacon 119.

In some embodiments, RF beacon 119 may be an off-the-shelf beacon such as, e.g., a beacon sold under the name "SmartBeacon-4AA Pro" or a beacon sold under the name "Yunzi," both of which are available from Sensoro Co., Ltd.

Figure 9:
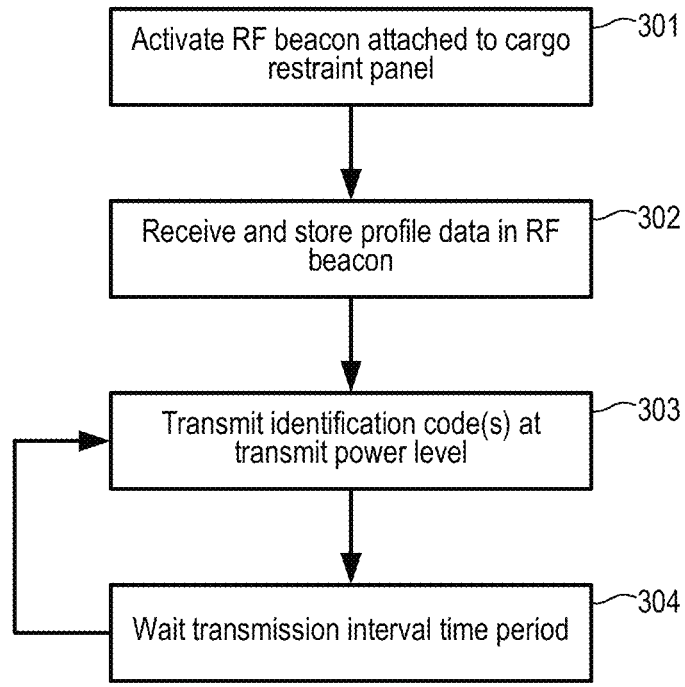
FIG. 9 is a flow chart showing operations performed by an RF beacon according to some embodiments.

FIG. 9 is a flow chart showing operations performed by RF beacon 119 according to some embodiments. In step 301, RF beacon 119 attached to a cargo restraint panel is activated. In some embodiments, RF beacon 119 may have a physical switch on housing 123 that is pressed or otherwise accessed to place RF beacon 119 in an ON state. In some embodiments, RF beacon 119 may be activated by installing battery 170, and with RF beacon 119 remaining in an ON state as long as battery 170 is installed and has a charge remaining.

In step 302, RF beacon 119 receives and stores profile data that assigns one or more identification codes and one or more operational parameters. In particular, transceiver 167 receives a modulated RF signal via antenna 168, demodulates that signal to recover profile data, and outputs that data to processor 165. Processor 165 then stores that profile data in memory 166.

The operational parameters in the profile data may include, e.g., a transmission interval and a transmission power level. The transmission power level may be selectable so that a user can balance battery life and transmission range. In particular, higher transmission power allows transmission over a greater range, but requires more power from battery 170. The identification codes in the profile data may include a code that uniquely identifies RF beacon 119. The identification codes may also include one or more codes that that identify one or more groups to which RF beacon 119 belongs. For example, a shipper may assign one group code for RF beacons associated with cargo restraint panels used in one geographic region, another group code for RF beacons associated with cargo restraint panels used in a different geographic region, etc. As another example, a shipper may assign one group code for RF beacons used for one type of cargo (e.g., toxic chemicals), another group code for RF beacons used with another type of cargo (e.g., food products), etc.

After receiving and storing profile data, and as shown at step 303, RF beacon 119 transmits the identification codes at the transmit power level. In particular, processor 165 provides identification data representing the identification codes to transceiver 167. Processor 165 also causes transceiver 167 to output a modulated RF signal, via antenna 168 and at the transmit power level, that communicates the identification data. Processor 165 then waits an amount of time corresponding to the transmission interval (step 304), and then repeats step 303. The cycle of steps 303 and 304 continues until interrupted by RF beacon 119 being turned OFF.

Figure 10:
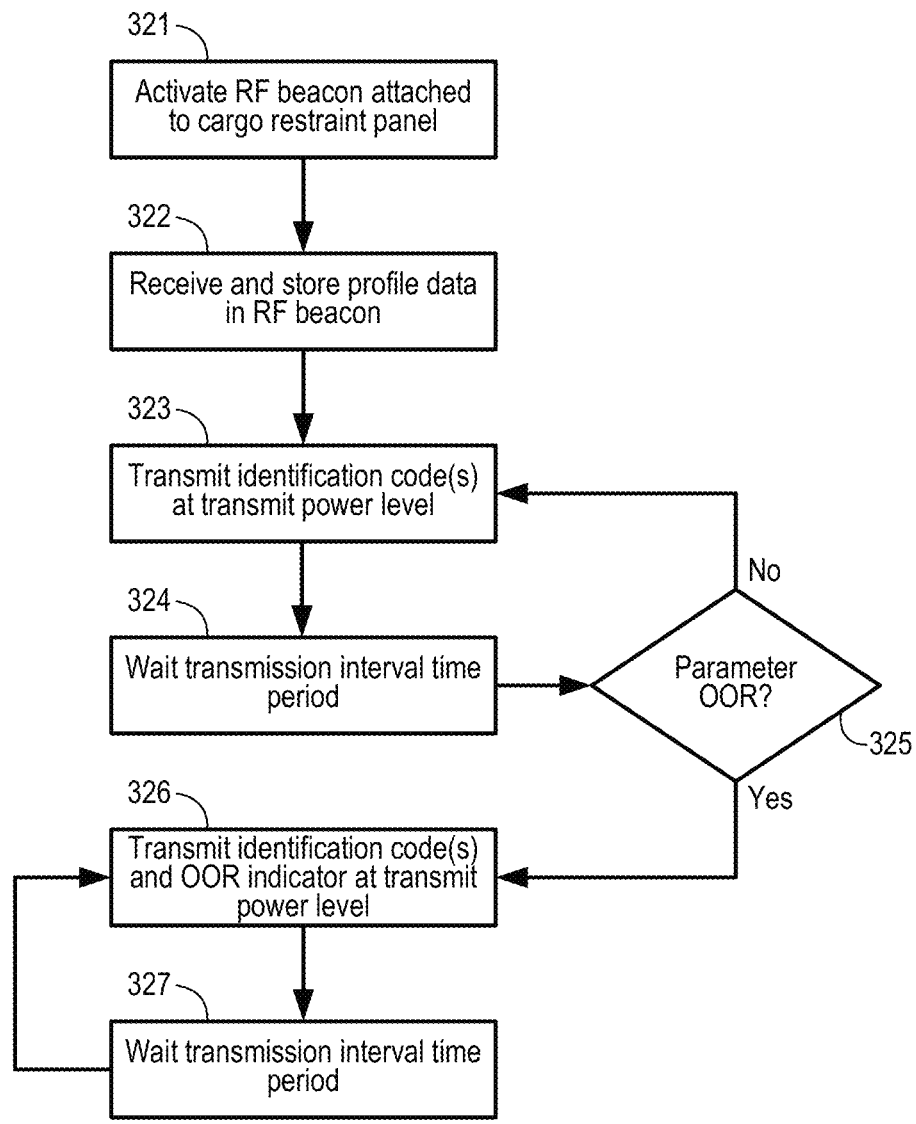
FIG. 10 is a flow chart showing operations performed by an RF beacon according to some further embodiments.

As discussed above in connection with FIG. 8, in some embodiments RF beacon 119 may include one or more sensors that measure an environmental parameter. FIG. 10 is flow chart showing steps performed by RF beacon 119 according to some such embodiments.

In step 321, an RF beacon 119 attached to a cargo restraint panel is activated. RF beacon 119 may be activated in step 321 in a manner similar to that described in connection with step 301 of FIG. 9. In step 322, RF beacon 119 receives and stores profile data. Step 322 may be performed in a manner similar to that described in connection with step 302 of FIG. 9. In step 322, however, the one or more operational parameters included in the profile data may include one or more threshold values for one or more environmental parameters measured by sensor(s).

In some embodiments, one or more threshold values may indicate a range of allowable values for measurements of the corresponding parameter. Examples of environmental parameter threshold values that can be transmitted in connection with a particular type of sensor, as well as acceptable parameter ranges that may be indicated by such threshold values, are provided below in Table 1.

TABLE 1

| Sensor Type | Threshold Value(s) | Acceptable Range Indicated by Threshold Value(s) |
|---|---|---|
| acceleration | $Acc_{MAX}$ [e.g., in multiples of G] | measured accel. $\leq Acc_{MAX}$ |
| temperature | $Temp_{MAX}$ [e.g., in ° F. or ° C.] | measured temp. $\leq Temp_{MAX}$ |
| temperature | $Temp_{MIN}$ [e.g., in ° F. or ° C.] | measured temp. $\geq Temp_{MIN}$ |
| temperature | $Temp_{MIN}$, $Temp_{MAX}$ [e.g., in ° F. or ° C.] | $Temp_{MIN} \leq$ measured temp. $\leq Temp_{MAX}$ |
| temperature | Temp, ΔTemp [e.g., in ° F. or ° C.] | Temp − ΔTemp < measured temp. < Temp + ΔTemp |
| humidity | $Hu_{MAX}$ [e.g., in % (rel.), g/cm³ (abs.)] | measured humid. $\leq Hu_{MAX}$ |
| humidity | $Hu_{MIN}$ [e.g., in % (rel.), g/cm³ (abs.)] | measured humid. $\geq Hu_{MIN}$ |
| humidity | $Hu_{MIN}$, $Hu_{MAX}$ [e.g., in % (rel.), g/cm³ (abs.)] | $Hu_{MIN} \leq$ measured humid. $\leq Hu_{MAX}$ |
| humidity | Hu, ΔHu [e.g., in % (rel.), g/cm³ (abs.)] | Hu − ΔHu < measured humid. < Hu + ΔHu |

Table 1 also provides examples of units that may be associated with threshold values (and by implication, with acceptable ranges).

In step 323, RF beacon 119 transmits the identification codes at the transmit power level. Step 323 may be performed in a manner similar to that described in connection with step 303 of FIG. 9. In step 324, processor 165 waits an amount of time corresponding to the transmission interval before proceeding to step 325.

In step 325, processor 165 determines if a measured value for an environmental parameter is outside of a range (OOR) indicated by the threshold value(s) provided in the profile data. In some embodiments, processor 165 may perform step 325 by a simple comparison of the output of sensor 169 with the acceptable range indicated by the threshold value(s). If that comparison shows the sensor output value is outside the range, the "yes" branch from step 325 is followed. If that comparison shows the sensor output value is not outside the range, the "no" branch from step 325 is followed.

If processor 165 follows the "no" branch from step 325, processor repeats step 323, repeats step 324, and repeats step 325, with this pattern continuing until it is necessary to follow the "yes" branch from step 325, or until interrupted by RF beacon 119 being turned OFF.

If processor 165 follows the "yes" branch from step 325, processor 165 performs step 326. In step 326, RF beacon 119 transmits the identification codes and an indicator that a value for the environmental parameter measured by sensor 169 has gone outside of an allowable range. In particular, processor 165 provides transceiver 167 with identification data that represents the identification codes and with OOR data that indicates the out-of-range condition for the measured parameter value. Processor 165 then causes transceiver 167 to output a modulated RF signal, via antenna 168 and at the transmit power level, that communicates the identification data and the OOR data. Processor 165 then waits an amount of time corresponding to the transmission interval (step 327), and then repeats step 326. The cycle of steps 326 and 327 then continues until interrupted by RF beacon 119 being turned OFF.

Figure 11:
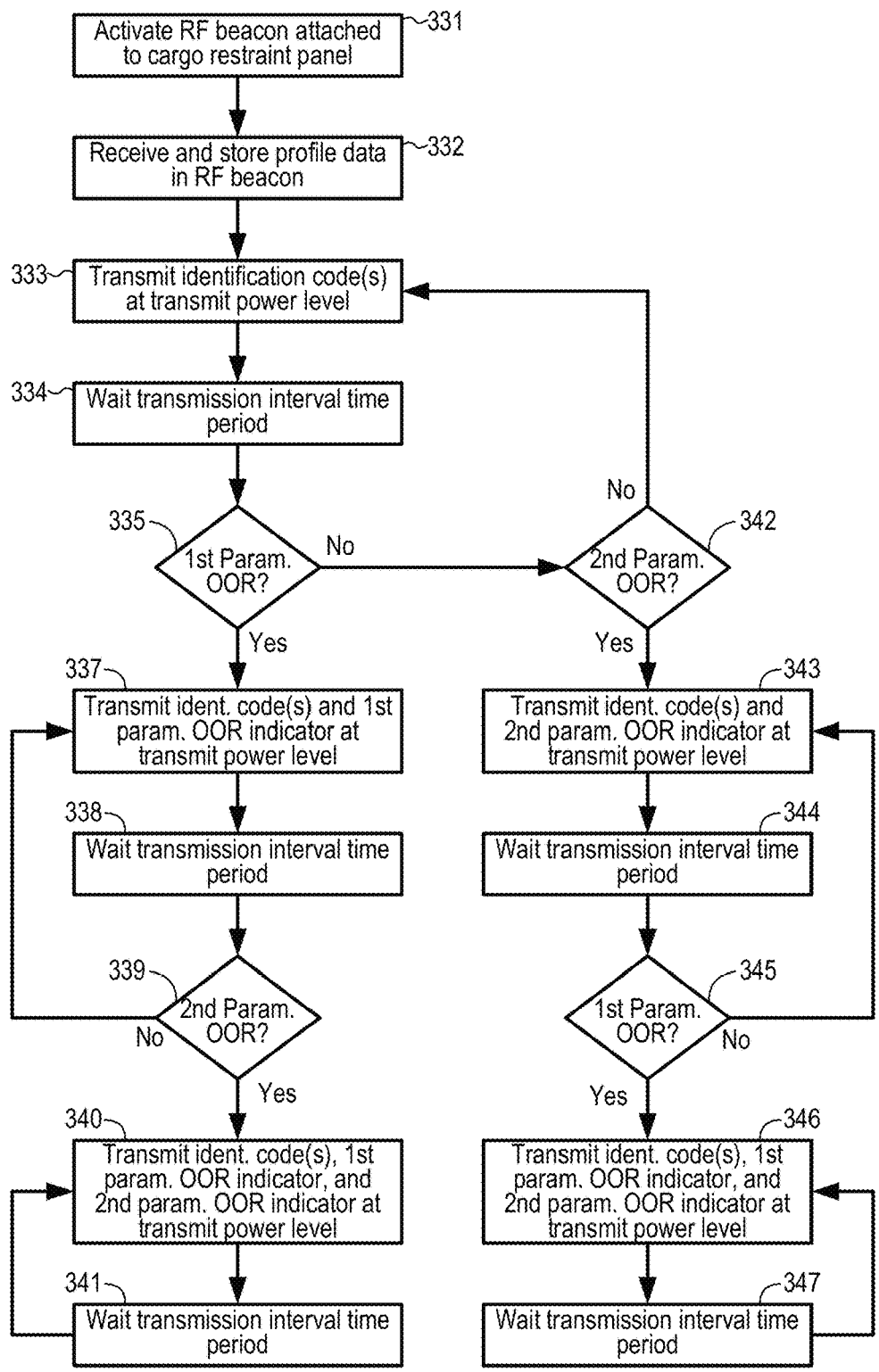
FIG. 11 is a flow chart showing operations performed by an RF beacon according to some additional embodiments.

FIG. 11 is flow chart showing steps performed by RF beacon 119 according to some additional embodiments. In the embodiment of FIG. 11, RF beacon 119 independently monitors two environmental parameters (e.g., acceleration and temperature). If a measured value for one of those parameters is outside an allowable range, and similar to the embodiment of FIG. 10, an OOR indicator for that parameter is added to the transmitted identification codes. RF beacon 119 then continues to monitor the other of those two parameters. If a measured value for that other parameter is out-of-range, then an OOR indicator for that parameter is added to the data transmitted by RF beacon 119.

In step 331, an RF beacon 119 attached to a cargo restraint panel is activated. RF beacon 119 may be activated in step 331 in a manner similar to that described in connection with step 321 of FIG. 10. In step 332, RF beacon 119 receives and stores profile data. Step 332 may be performed in a manner similar to that described in connection with step 322 of FIG. 10. In step 332, however, the one or more operational parameters included in the profile data may include one or more threshold values for a first environmental parameter measured by a first of sensors 169 and one or more threshold values for a second environmental parameter measured by a second of sensors 169. In step 333, RF beacon 119 transmits the identification codes at the transmit power level. Step 333 may be performed in a manner similar to that described in connection with step 323 of FIG. 10. In step 334, processor 165 waits an amount of time corresponding to the transmission interval before proceeding to step 335.

In step 335, processor 165 determines if a measured value for the first environmental parameter is outside of a range indicated by corresponding threshold value(s) provided in the profile data. If so, processor 165 follows the "yes" branch to step 337 (discussed below). If not, processor 165 follows the "no" branch to step 342. In step 342, processor 165 determines if a measured value for the second environmental parameter is outside of a range indicated by corresponding threshold value(s) provided in the profile data. If so, processor 165 follows the "yes" branch to step 343 (discussed below). If not, processor 165 returns on the "no" branch to step 333.

If the "yes" branch from step 335 is followed, processor 165 goes to step 337. In step 337, processor 165 provides transceiver 167 with identification data that represents the identification codes and with first OOR data that indicates the out-of-range condition for the measured first parameter value. Processor 165 then causes transceiver 167 to output a modulated RF signal, via antenna 168 and at the transmit power level, that communicates the identification data and the first OOR data. Processor 165 then waits an amount of time corresponding to the transmission interval (step 338) and then continues to step 339. In step 339, processor 165 determines if a measured value for the second environmental parameter is outside of the range indicated by the corresponding threshold value(s) provided in the profile data. If not, processor 165 returns to step 337 on the "no" branch. If the measured value for the second environmental parameter is OOR, processor 165 continues to step 340 on the "yes" branch. In step 340, processor 165 provides transceiver 167 with identification data that represents the identification codes, with first OOR data that indicates the out-of-range condition for the measured first parameter value, and with second OOR data that indicates the out-of-range condition for the measured second parameter value. Processor 165 then causes transceiver 167 to output a modulated RF signal, via antenna 168 and at the transmit power level, that communicates the identification data, the first OOR data, and the second OOR data. Processor 165 then waits an amount of time corresponding to the transmission interval (step 341) before returning to step 340.

If the "yes" branch from step 342 is followed, processor 165 goes to step 343. In step 343, processor 165 provides transceiver 167 with identification data that represents the identification codes and with second OOR data that indicates the out-of-range condition for the measured second parameter value. Processor 165 then causes transceiver 167 to output a modulated RF signal, via antenna 168 and at the transmit power level, that communicates the identification data and the second OOR data. Processor 165 then waits an amount of time corresponding to the transmission interval (step 344) and then continues to step 345. In step 345, processor 165 determines if a measured value for the first environmental parameter is outside of the range indicated by the corresponding threshold value(s) provided in the profile data. If not, processor 165 returns to step 343 on the "no" branch. If the measured value for the first environmental parameter is OOR, processor 165 continues to step 346 on the "yes" branch. In step 346, processor 165 provides transceiver 167 with identification data that represents the identification codes, with first OOR data that indicates the out-of-range condition for the measured first parameter value, and with second OOR data that indicates the out-of-range condition for the measured second parameter value. Processor 165 then causes transceiver 167 to output a modulated RF signal, via antenna 168 and at the transmit power level, that communicates the identification data, the first OOR data, and the second OOR data. Processor 165 then waits an amount of time corresponding to the transmission interval (step 347) before returning to step 346.

In some embodiments, an RF beacon 119 may independently monitor more than two parameters. As an OOR condition is determined for each parameter, an OOR indicator for that parameter is added to the data transmitted by the beacon.

Figure 12:
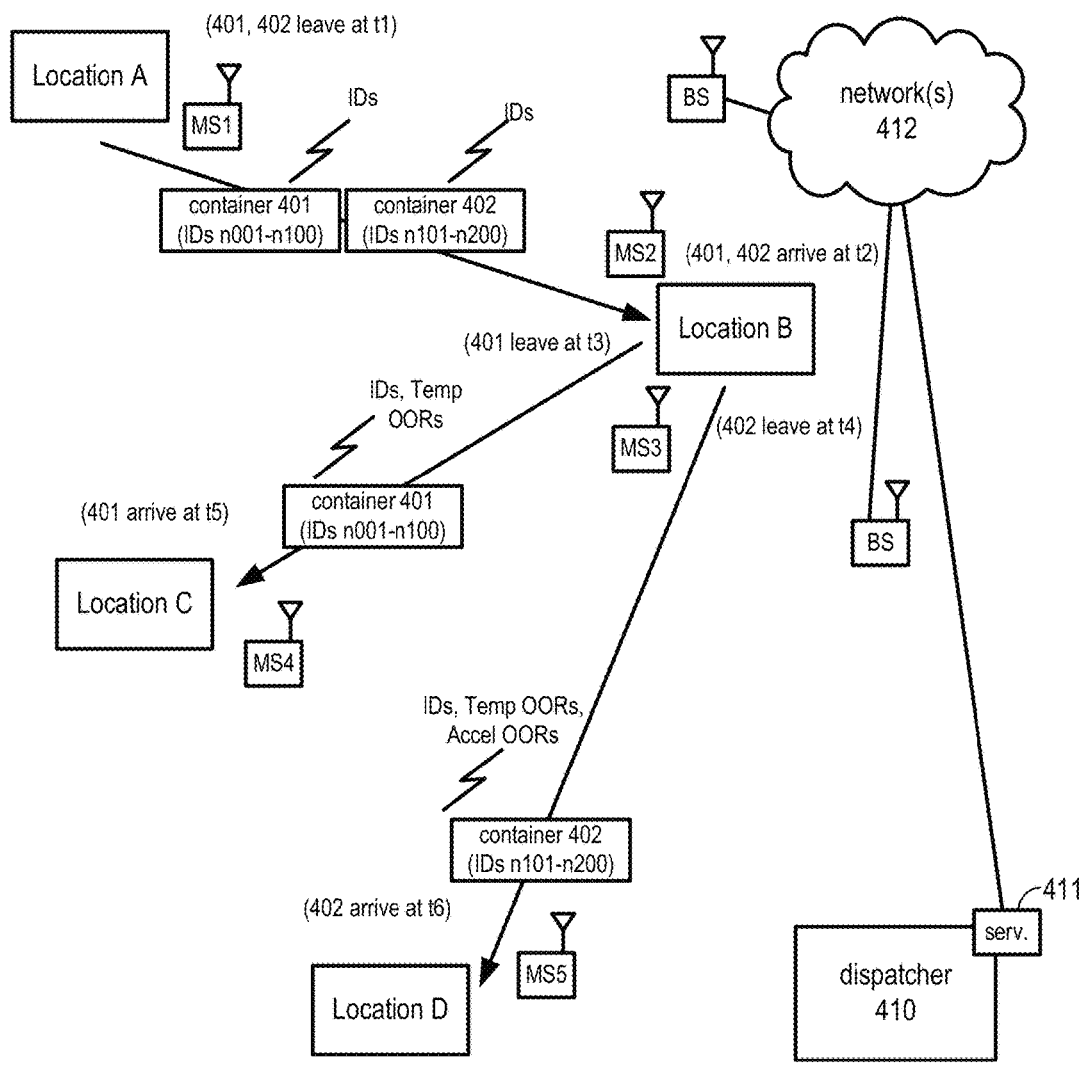
FIG. 12 is a block diagram illustrating a simplified example of use of cargo restraint panels according to some embodiments.

FIG. 12 is a block diagram illustrating a simplified example of use of cargo restraint panels according to some embodiments. At location A, a first shipping container 401 is loaded with cargo units and 100 cargo restraint panels having identification codes n001 through n100. A second shipping container 402 is loaded at location A with cargo units and 100 cargo restraint panels having identification codes n101 through n200. Containers 401 and 402 may be railcars, intermodal transport containers, semi trailers, or other form of shipping container. As containers 401 and 402 leave location A at time t1, a monitoring station MS1 positioned at a location A exit receives RF signals from the RF beacons 119 in the cargo restraint panels in containers 401 and 402. Based on the identification codes in those RF signals, monitoring station MS1 determines that panels n001 through n200 left location A as of time t1, and that no OOR indications were received. Monitoring station MS1 transmits, to a server 411 of dispatcher 410 via one or more networks 412, data indicating: the departure of panels n001-n200 from location A, the time t1 of departure, the absence of any OOR indications, and an identifier (and/or a location) of monitoring station MS1. Monitoring station MS1, as well as other monitoring stations, may communicate with one or more base stations (BS) in a wide area wireless network. Those base stations may communicate via one or more additional networks 412 (e.g., the Internet) with server 411.

Containers 401 and 402 arrive at location B at subsequent time t2. A monitoring station MS2 positioned at an entrance to location B receives RF signals from the RF beacons 119 in the cargo restraint panels in containers 401 and 402. Based on the identification codes in those RF signals, monitoring station MS2 determines that panels n001 through n200 arrived at location B as of time t2, and that no OOR indications were received. Monitoring station MS2 transmits, to server 411, data indicating: that arrival, the time of arrival t2, the absence of any OOR indications, and an identifier (and/or a location) of monitoring station MS2.

While in location B, the temperatures inside containers 401 and 402 exceed an allowable range. As a result, the RF beacons 119 of the cargo restraint panels inside those containers begin transmitting a temperature OOR indication with the transmissions of their identification codes. Also at location B, containers 401 and 402 are separated so that container 401 may continue to location C and container 402 may continue to location D. Container 401 leaves location B at a time t3. A monitoring station MS3 positioned at an exit from location B receives RF signals from the RF beacons 119 in the cargo restraint panels in container 401. Based on the identification codes in those RF signals, monitoring station MS3 determines that panels n001 through n100 left location B at time t3, and that those panels were reporting OOR temperature indications. Monitoring station MS3 transmits, to server 411, data indicating: that departure, the time of departure t3, the temperature OOR indications, and an identifier (and/or a location) of monitoring station MS3. Container 402 leaves location B at a later time t4. Monitoring station MS3 receives RF signals from the RF beacons 119 in the cargo restraint panels in container 402. Based on the identification codes in those RF signals, monitoring station MS3 determines that panels n101 through n200 left location B at time t4, and that those panels were reporting temperature OOR indications. Monitoring station MS3 transmits, to server 411, data indicating: that departure, the time of departure t4, the temperature OOR indications, and an identifier (and/or a location) of monitoring station MS3.

Container 401 arrives at location C at time t5. Monitoring station MS4 at an entrance to location C receives RF signals from the RF beacons 119 in the cargo restraint panels in container 401. Based on the identification codes in those RF signals, monitoring station MS4 determines that panels n001 through n100 arrived at location C at time t5, and that those panels were reporting OOR temperature indications. Monitoring station MS4 transmits, to server 411, data indicating: that arrival, the time of arrival t5, the temperature OOR indications, and an identifier (and/or a location) of monitoring station M4.

While in route from location B to location D, container 402 experiences excessive acceleration as a result of an overly abrupt stop. This causes the RF beacons 119 of the cargo restraint panels inside container 402 to begin transmitting an acceleration OOR indication with the temperature OOR indications and their identification codes. Container 402 arrives at location D at time t6. Monitoring station MS5 at an entrance to location D receives RF signals from the RF beacons 119 in the cargo restraint panels in container 402. Based on the identification codes in those RF signals, monitoring station MS4 determines that panels n101 through n200 arrived at location D at time t6, and that those panels were reporting OOR acceleration and OOR temperature indications. Monitoring station MS5 transmits, to server 411, data indicating: that arrival, the time of arrival t6, the temperature OOR indications, the acceleration OOR indications, and an identifier (and/or a location) of monitoring station MS5.

Figure 13:
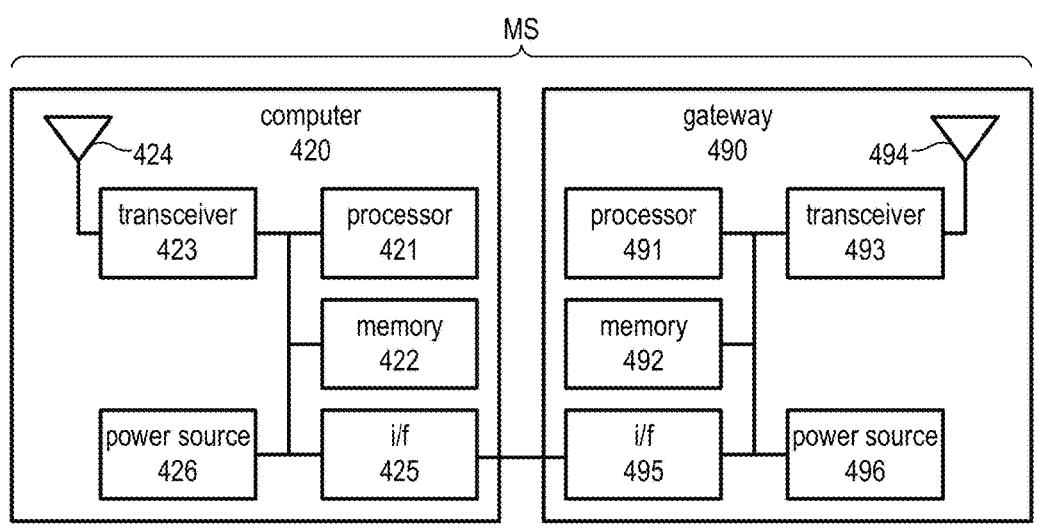
FIG. 13 is a block diagram showing components of a monitoring station according to some embodiments.

As can be appreciated from the above, dispatcher 410 obtains significant useful information from RF beacons 119. For example, dispatcher 410 can track the location of cargo restraint panels to which those beacons are attached based on the locations of the monitoring stations providing the transmissions to server 411 as described above. This information can be used to determine panel inventory levels and locations among which panels could be transferred. As another example, and when combined with information about the cargo loaded with a particular set of panels, dispatcher 410 can track locations of cargo shipments. As a further example, data indicating locations and/or times that OOR indications were initially received can be used to help isolate when and where problems may have occurred during shipment. As yet another example, data from monitoring stations can be used to track the number of times each cargo restraint panel has been used in transport FIG. 13 is a block diagram showing components of monitoring station MS according to some embodiments. Any of monitoring stations MS1 through MS5 of FIG. 12 may have a structure similar to that shown in FIG. 13. In some embodiments, a monitoring station may comprise a computer 420 that is communicatively coupled to a cellular gateway 490. Computer 420 may comprise one or more processors 421, one or more memories 422, one or more wireless transceivers 423 having one or more antennas 424, one or more communications interfaces (I/F) 425, and one or more power sources 426. For convenience, the remaining discussion of computer 420 will refer to a single processor, a single memory, a single transceiver, etc. In some embodiments, however, operations described in connection with a single component of computer 420 could be carried out by and/or distributed across multiple instances of that component within a computer 420.

Processor 421 executes instructions stored by memory 422 and performs operations as a result of that execution. Those operations may include reading or writing data to memory 422, causing transceiver 423 to transmit data via antenna 424, receiving data from transceiver 423 that was received via antenna 424, causing interface 425 to transmit data, receiving data from interface 425, and/or other operations such as are described herein. Processor 421 may be a general purpose microprocessor programmed to perform operations described herein, an application specific integrated circuit (ASIC) specially configured to perform operations described herein, and/or other type of computational circuitry configured to perform operations such as are described herein. Memory 422 stores data in a non-transitory manner. Memory 422 may be FLASH memory, RAM, or other type of known memory. Memory 422 is shown separately from processor 421 in FIG. 13 for convenience, but processor 421 and some or all of memory 422 may reside on the same chip. Transceiver 423 comprises circuitry configured to receive data from processor 421 and transmit that data as modulated RF signals through antenna 424, as well as circuitry configured to receive modulated RF signals through antenna 424, demodulate those signals, and output resulting data to processor 421. Transceiver 423 is configured to transmit and receive RF signals according to one or more known protocols. In some embodiments, transceiver 423 operates in accordance with one or more BLUETOOTH® standards. In other embodiments, alternate communication protocols are used. Interface 425 comprises circuitry to send and receive data according to a known standard. In some embodiments, interface 425 may be a universal serial bus (USB) or Ethernet interface. Power source 426 may be a battery or other known type of power source.

Gateway 490 similarly comprises one or more processors 491, one or more memories 492, one or more wireless transceivers 493 having one or more antennas 494, one or more communications interfaces (I/F) 495, and one or more power sources 496. Gateway 490 may be a special purpose computer configured to receive and send data over interface 495 and to send and receive that data over a cellular telephone (or other wide area wireless) network using transceiver 493. Processor 491 executes instructions stored by memory 492 and performs operations as a result of that execution. Those operations may include establishing data links over a wide area wireless network, reading or writing data to memory 492, causing transceiver 493 to transmit data via antenna 494, receiving data from transceiver 493 that was received via antenna 494, causing interface 495 to transmit data, receiving data from interface 495, and/or other operations such as are described herein. Processor 491 and memory 492 may be similar to other processors and memories described herein, but store data and instructions to carry out operations of gateway 490. Interface 495 may be similar to interface 425. Transceiver 493 comprises circuitry configured to receive data from processor 491 and transmit that data as modulated RF signals through antenna 494, as well as circuitry configured to receive modulated RF signals through antenna 494, demodulate those signals, and output resulting data to processor 491. Power source 496 may also be a battery or other type of known power source.

Gateways such as gateway 490 are known and commercially available. One example of such a gateway is the device sold by Shenzhen Hybertone Technology Co., Ltd. under the model name GoIP-1.

In some embodiments, load restraint strip systems may include RF beacons 119. Load restraint strip systems can be used to secure cargo within a shipping container. Such systems may include load restraint strips and connecting strips. Load restraint strips may be flexible and have adhesive coated ends that are pressed into contact with interior side walls of a container. The other ends, or tails, of the strips may then be wrapped around cargo and tightened. The wrapped ends may be tightened using a tool and method such as are described in U.S. Pat. No. 6,981,827, which patent is incorporated by reference herein. An adhesive-backed connecting strip may then be applied over the tightened ends to secure those ends together. There are various known types of load restraint strips and connecting strips. Such strips typically include a backing and some form of reinforcement. Examples of known strips are described in one or more of U.S. Pat. Nos. 6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852, 8,419,329, 8,979,449, and 9,090,194, all of which are incorporated by reference herein.

Figure 14:
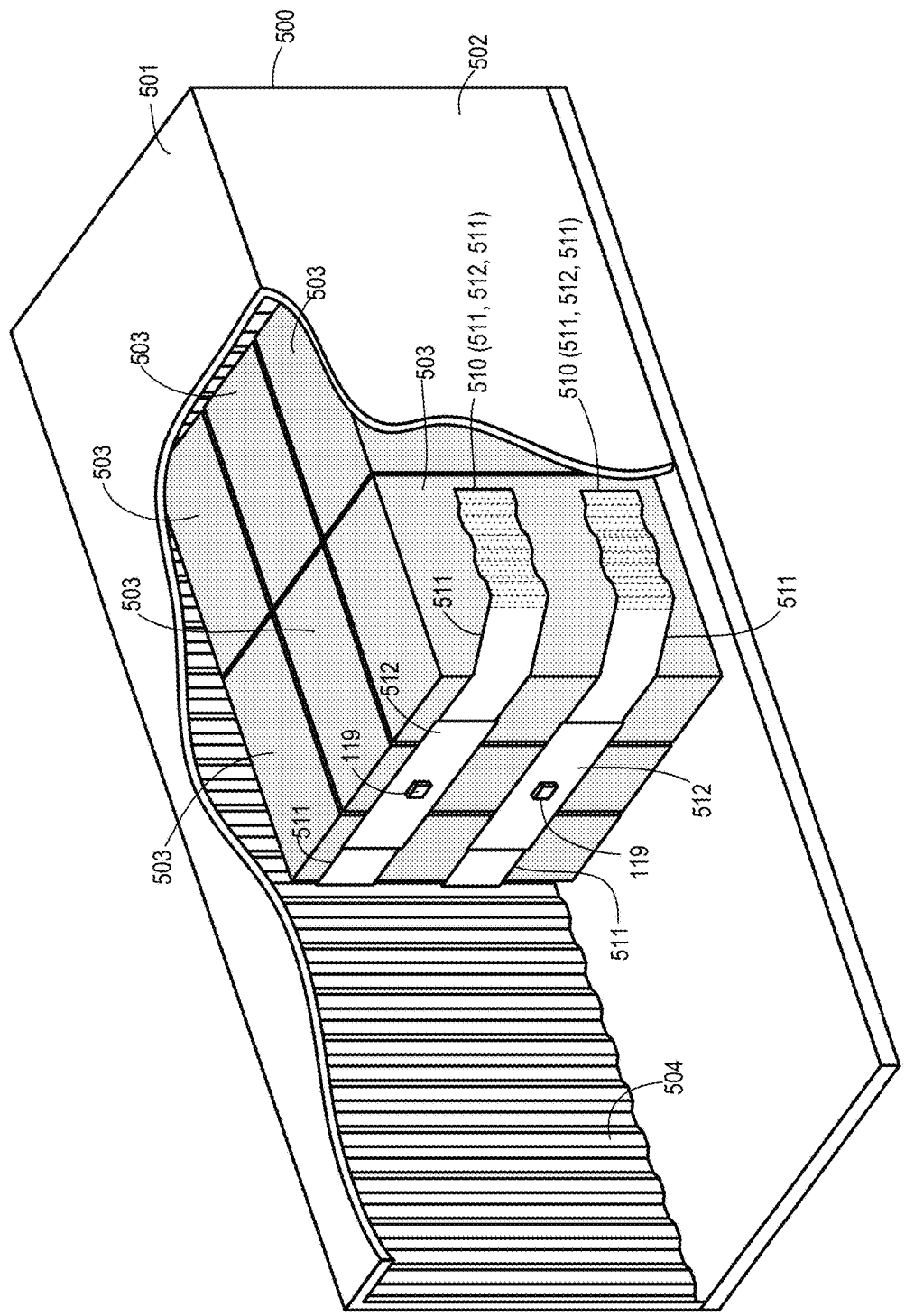
FIG. 14 is a perspective view showing load restraint strip systems, according to some embodiments, in which RF beacons are attached to connecting strips.

FIG. 14 is a perspective view showing load restraint strip systems, according to some embodiments, in which RF beacons are attached to connecting strips. FIG. 14 shows a shipping container 500 in which portions of a top 501 and right side wall 502 have been cut away. In the example of FIG. 14, shipping container 500 is an intermodal transport container. However, load restraint strip systems according to various embodiments can also be used with other types of shipping containers. Also shown in FIG. 14 are cargo units 503 secured by load restraint strip systems 510. Each load restraint strip system includes a pair of load restraint strips 511 and a connecting strip 512. Each of strips 511 may be, e.g., a known type of load restraint strip such as is described in one of the previously-mentioned U.S. patents. The stippling visible for two of strips 511 represents adhesive that has been pressed into contact with interior surfaces of right side wall 502. Although not visible in FIG. 14, ends of the other strips 511 on the left side of cargo units 503 have been pressed into contact with left side wall 504. Connecting strips 512 are similar to conventional connecting strips. Unlike conventional connecting strips, however, and as described in more detail below, each of connecting strips 512 includes an RF beacon 119 attached to its exterior face.

Figure 15:
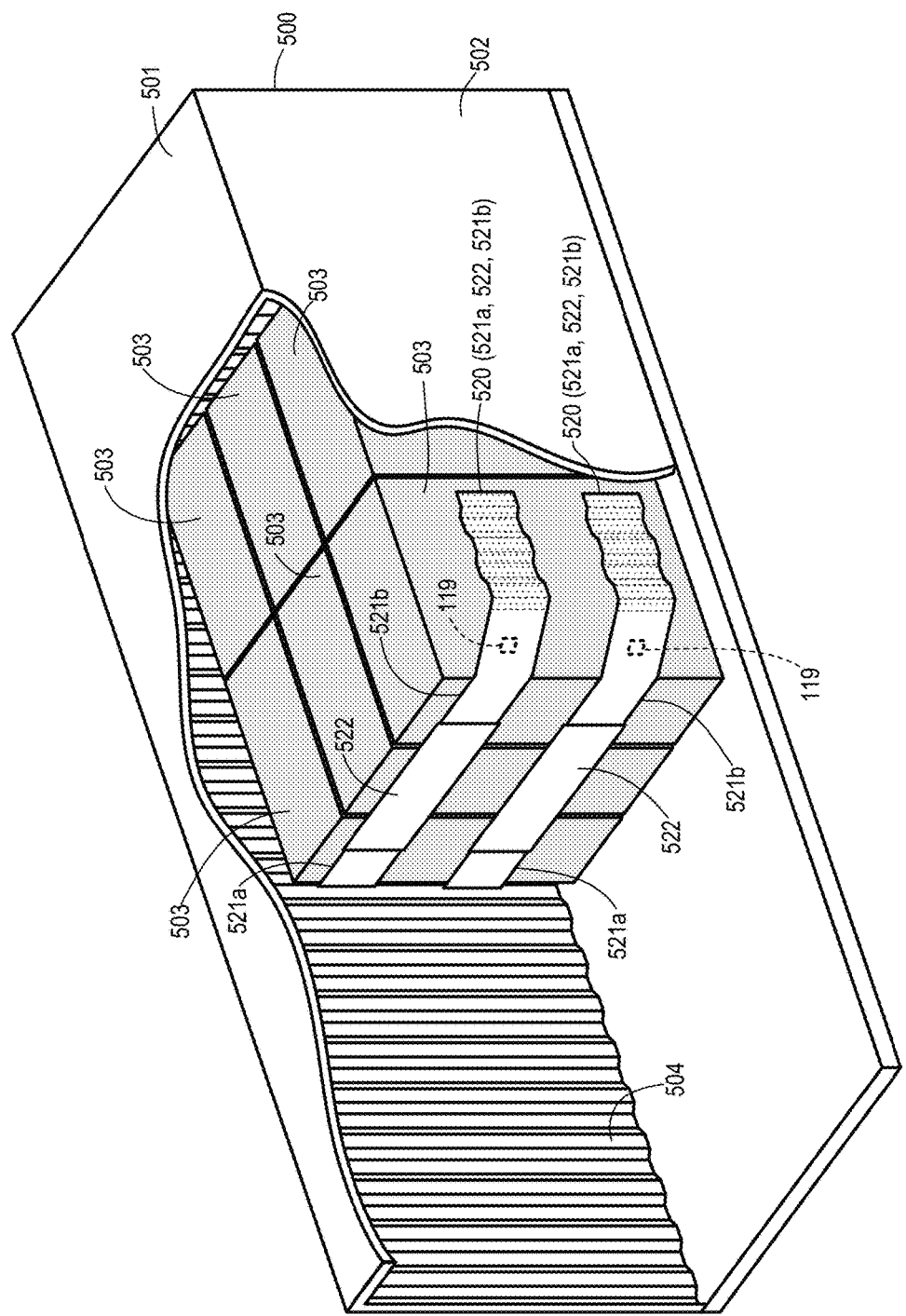
FIG. 15 is a perspective view showing load restraint strip systems, according to some embodiments, in which RF beacons are attached to load restraint strips.

FIG. 15 is a perspective view showing load restraint strip systems, according to some embodiments, in which RF beacons are attached to connecting strips. Shipping container 500 and cargo units 503 of FIG. 15, which are similar to shipping container 500 and cargo units 503 of FIG. 14, are secured by load restraint strip systems 520. Each of systems 520 comprises a load restraint strip 521a, a connecting strip 522, and a load restraint strip 521b. Load restraint strips 521a and connecting strips 522 may respectively be, e.g., conventional load restraint strips and conventional connecting strips. Load restraint strips 521b are similar to load restraint strips 521a. Unlike strips 521a, however, and as described in more detail below, strips 521b include RF beacons 119 attached to their interior faces.

Figure 16:
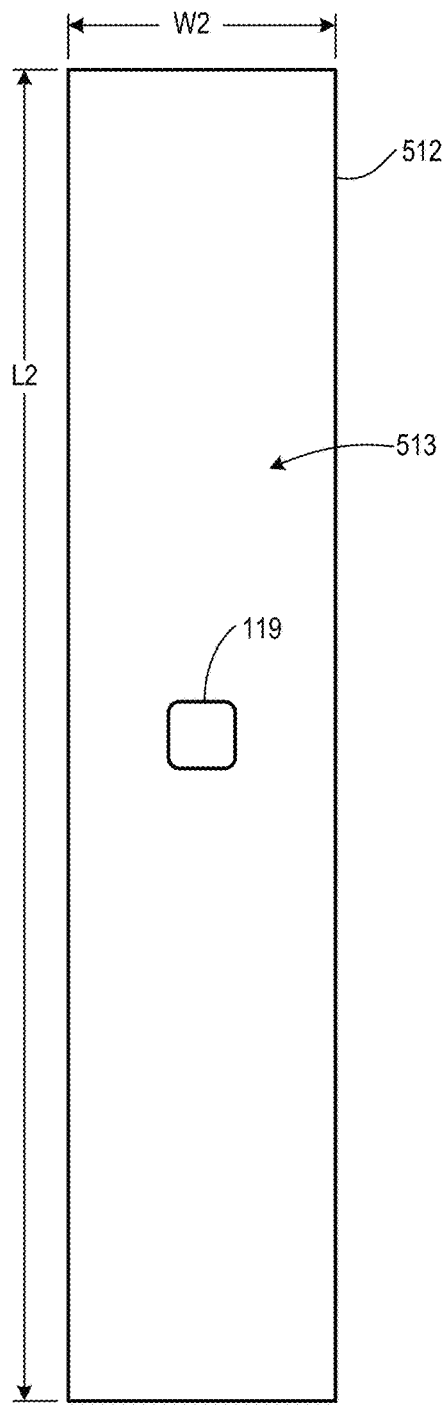
FIG. 16 is a partially schematic plan view showing an exterior face of a connecting strip according to at least some embodiments.
Figure 17:
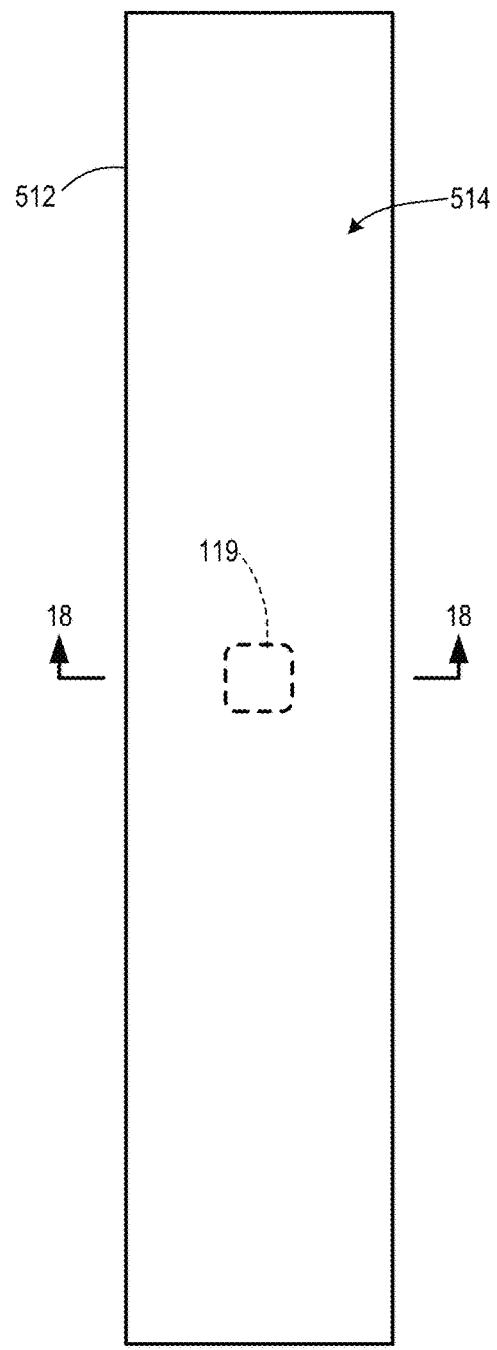
FIG. 17 is a partially schematic plan view showing an interior face of a connecting a strip according to at least some embodiments.

FIG. 16 is a partially schematic plan view showing an exterior face 513 of connecting strip 512 (FIG. 14) according to at least some embodiments. FIG. 17 is a partially schematic plan view showing an interior face 514 of connecting strip 512. Connecting strip may have a length L2 and a width W2. In some embodiments, L2 is between 4 feet and 6 feet (e.g., 5 feet) and W2 is between 9 and 16 inches (e.g., 12 inches). RF beacon 119 may be bonded to exterior face 513 at approximately the midpoint of L2 and the midpoint of W2.

Figure 18:
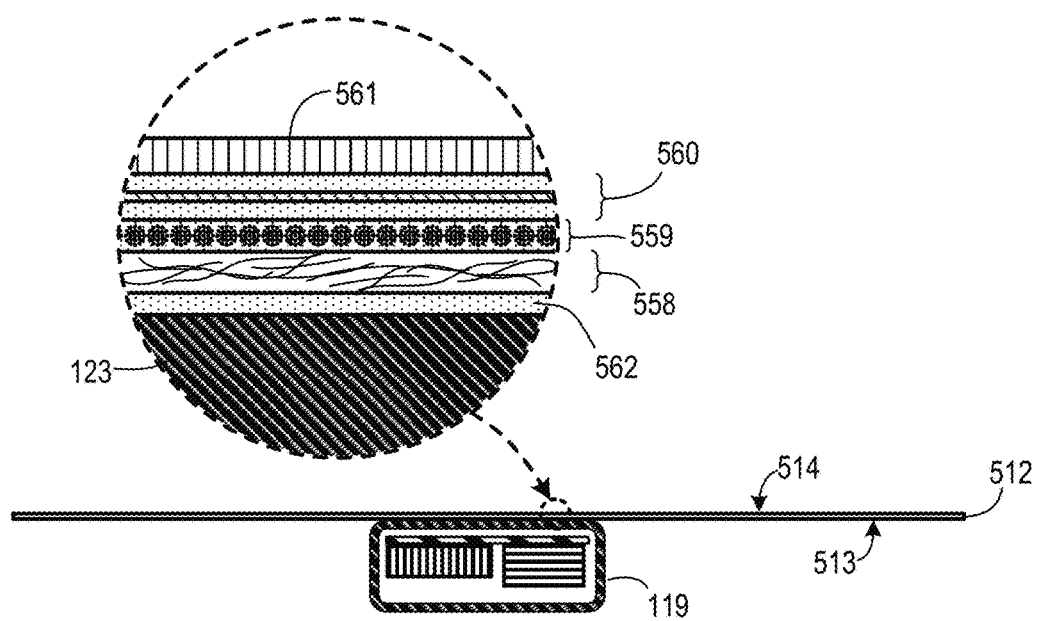
FIG. 18 is a partially schematic area cross-sectional view taken from a sectioning plane having the location indicated in FIG. 17.

In some embodiments, and apart from the presence of attached RF beacon 119, connecting strip 512 may have a structure that is the same as or similar to that of known connecting strips. FIG. 18 is a partially schematic area cross-sectional view of connecting strip 512 taken from a sectioning plane having the location indicated in FIG. 17. An enlarged portion of FIG. 18 shows additional details of strip 512. Except for the portion of housing 123 of RF beacon 119 shown in that enlargement, the indicated structure may extend throughout the length L2 and width W2 of strip 512. Connecting strip 512 comprises a base layer 558, a reinforcement layer 559, and an attachment layer 560. Base layer 558 may be similar to, and be formed from materials described above in connection with, base layer 128 of facing material 115 of cargo restraint panel 100. Reinforcement layer 559 may be similar to, and be formed from materials described above in connection with, reinforcement layer 129 of facing material 115. Attachment layer 560 may be similar to, and be formed from materials described above in connection with, attachment layer 130 of facing material 115. A removable release paper liner 561 may cover attachment layer 560 and be removed prior to affixing strip 512 to connect load restraint strips. Liner 561 can be formed from, e.g., a paper product that is treated to resist the adhesive of layer 560. Such products include paper that has been coated or otherwise impregnated with wax, silicone or other non-stick material. A separate layer of adhesive 562, which is confined to the area of base layer 558 overlapped by housing 123 of RF beacon 119, bonds housing 123 to base layer 558.

Figure 19:
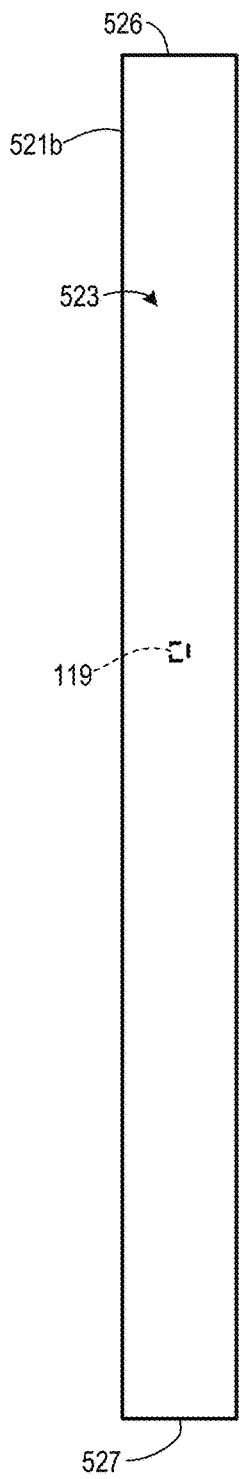
FIG. 19 is a partially schematic plan view showing an exterior face of a load restraint strip according to at least some embodiments.
Figure 20:
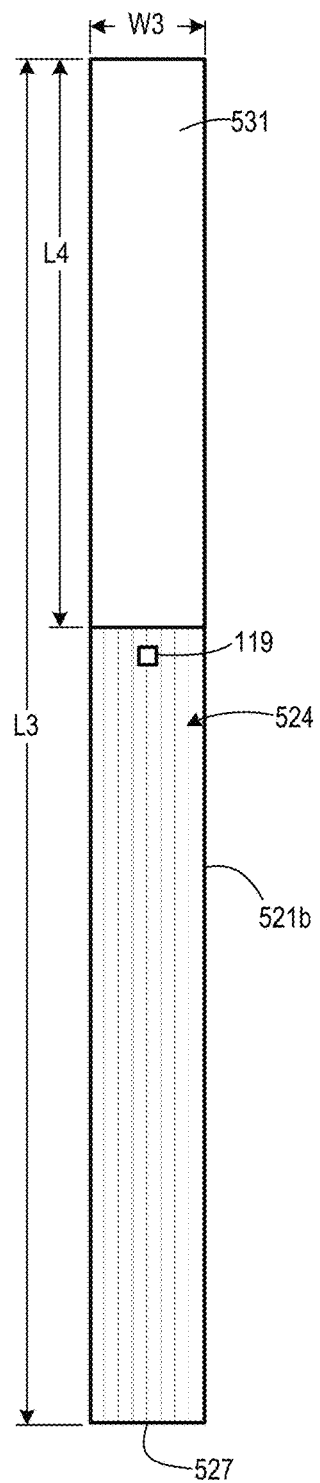
FIG. 20 is a partially schematic plan view showing an interior face of the load restraint strip of claim 19 in a lined condition.
Figure 21:
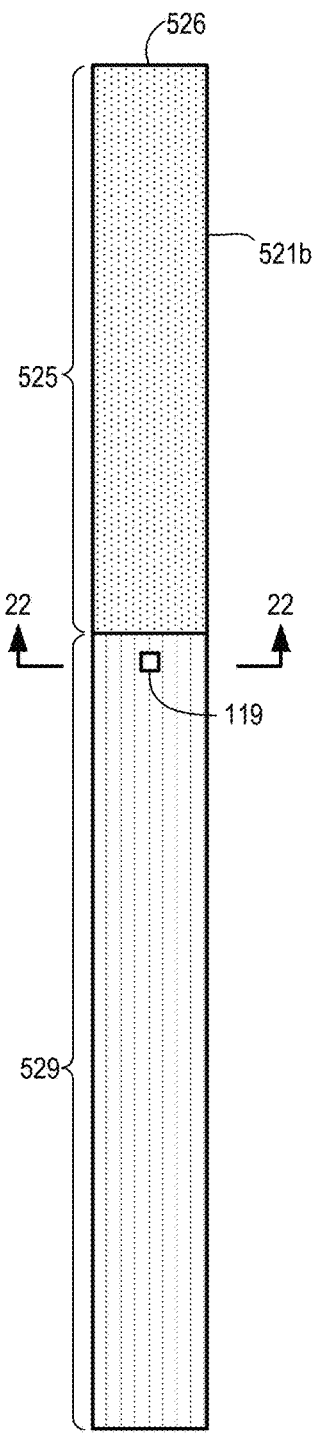
FIG. 21 is a partially schematic plan view showing the interior face of the load restraint strip of claim 19, and with a liner removed.

FIG. 19 is a partially schematic plan view showing an exterior face 523 of load restraint strip 521b (FIG. 15) according to at least some embodiments. FIG. 20 is a partially schematic plan view showing an interior face 524 of load restraint strip 521b in a lined condition, and in particular, with a release paper liner 531 covering an adhesive of an attachment region 525. FIG. 21 is a partially schematic plan view of strip 521b with liner 531 removed to expose the adhesive of attachment region 525 (shown with stippling). Also indicated are a first end 526 and a second end 527 of load restraint strip 521b. Strip 521b has a length L3 and a width W3, and attachment region 525 may have a length of L4. In some embodiments, L3 is between 9 and 16 feet (e.g., 12 feet), W3 is between 9 and 16 inches (e.g., 12 inches), and L4 is between 4 and 6 feet (e.g., 5 feet). A tail 529 of load restraint strip 521b extends from an intermediate location at the end of attachment region 525 to second end 527

Figure 22:
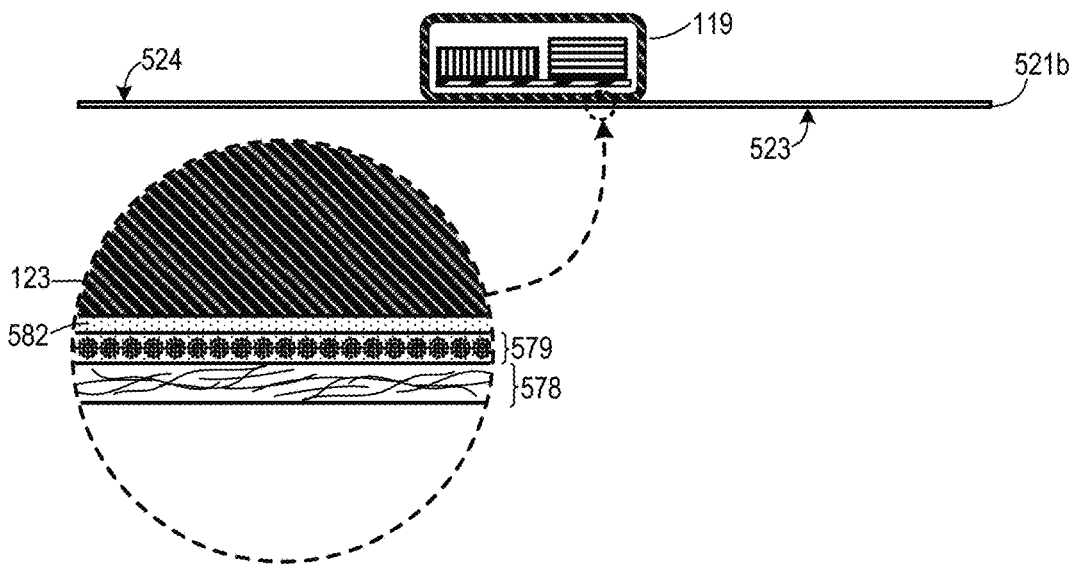
FIG. 22 is a partially schematic area cross-sectional view taken from a sectioning plane having the location indicated in FIG. 21.

In some embodiments, and apart from the presence of attached RF beacon 119, load restraint strip 521b may have a structure that is the same as or similar to that of known load restraint strips. FIG. 22 is a partially schematic area cross-sectional view of load restraint strip 521b taken from a sectioning plane having the location indicated in FIG. 21. An enlarged portion of FIG. 22 shows additional details of strip 521b. Except for the portion of housing 123 of RF beacon 119 shown therein, the structure indicated in the enlargement extends throughout all of tail 529 of strip 521b. The structure of strip 521b within attachment region 525, in a lined condition, may be similar to that shown in the enlarged portion of FIG. 18, but without inclusion of RF beacon 119.

Load restraint strip 521b comprises a base layer 578 and a reinforcement layer 579. Base layer 578 may be similar to, and formed from materials described above in connection with, base layer 128 of facing material 115 of cargo restraint panel 100. Reinforcement layer 579 may be similar to, and formed from materials described above in connection with, reinforcement layer 129 of facing material 115. A separate layer of adhesive 582, which is confined to the area of reinforcement layer 579 overlapped by housing 123 of RF beacon 119, bonds housing 123 to reinforcement layer 579. Within attachment region 525, an attachment layer similar to attachment layer 560 (FIG. 18) may be bonded to reinforcement layer 529. Release paper liner 531 may cover that attachment layer and be removed prior to affixing attachment region 525 to a container wall.

RF beacons 119 of load restraint strip systems 510 and 520 may operate according to methods similar to those described in connection with any of FIGS. 9 through 12, but with those methods modified to comprise RF beacons attached to components of load restraint strip systems instead of cargo restraint panels.

Figure 23:
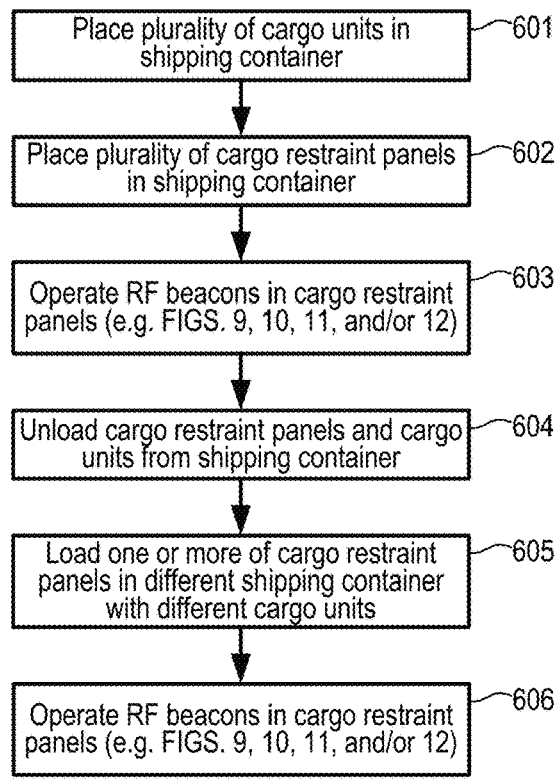
FIGS. 23 through 26 are block diagrams showing steps in methods according to some embodiments.

FIG. 23 is a flow chart showing steps in a method according to some embodiments. In step 601, a plurality of cargo units are placed in a shipping container. The shipping container may be a railcar, a semi trailer, an intermodal transport container, or other type of container. In step 602, a plurality of cargo restraint panels are placed in the shipping container. Steps 601 and 602 may be performed simultaneously. For example, workers may place one or more cargo restraint panels, then place one or more cargo units, then place more cargo restraint panels, etc. Each of the cargo restraint panels comprises an attached RF beacon such as, e.g., RF beacon 119. Each of the cargo restraint panels comprises a foam component having at least one polymer foam sheet and may have a structure such as is described in connection with any of the cargo restraint panel embodiments disclosed herein. After placement of the cargo units and the cargo restraint panels in the shipping container, the cargo units and the cargo restraint panels are arranged, in a front to rear direction of the cargo container, in alternating groups of one or more cargo units separated by one or more cargo restraint panels. A non-limiting example of placement of cargo units and cargo restraint panels is as shown in FIGS. 1A and 1B. The cargo restraint panels may be partially compressed after placement.

In step 603, the RF beacons of the cargo restraint panels operate as described in connection with any of FIGS. 9 through 12. In step 604, the cargo restraint panels and the cargo units are unloaded from the shipping container. In step 605, one or more of the cargo restraint panels are loaded with different cargo units (i.e., cargo units other than those loaded in step 601) in a different shipping container (i.e., a container other than the container loaded in step 601 and 602). In step 606, the RF beacons of the cargo restraint panels loaded in the different shipping container again operate as described in connection with any of FIGS. 9 through 12.

Figure 24:
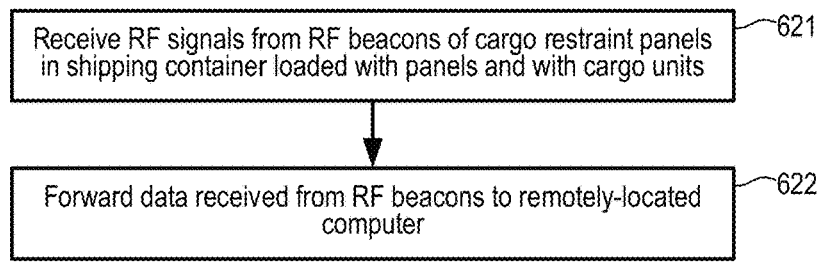

FIG. 24 is a flow chart showing steps in another method according to some embodiments. The method of FIG. 24 may be performed by a system that includes a monitoring station (such as one of monitoring stations MS in FIGS. 12 and 13) and a computer remotely located from that monitoring station (such as server 411 of FIG. 12). The method of FIG. 24 may also be performed in conjunction with some or all steps of the method of FIG. 23. In step 621, while a shipping container holding a plurality of cargo units and a plurality of cargo restraint panels is at a particular location, a monitoring station receives RF signals from RF beacons of cargo restraint panels in a shipping container loaded with those panels and with cargo units. As to each of those RF beacons, the RF signal received by the monitoring station comprises identification data. In some embodiments, the RF signal may also comprise other data such as one or more OOR indications. In step 622, the monitoring station forwards the data received from the RF beacons to the remotely-located computer.

Figure 25:
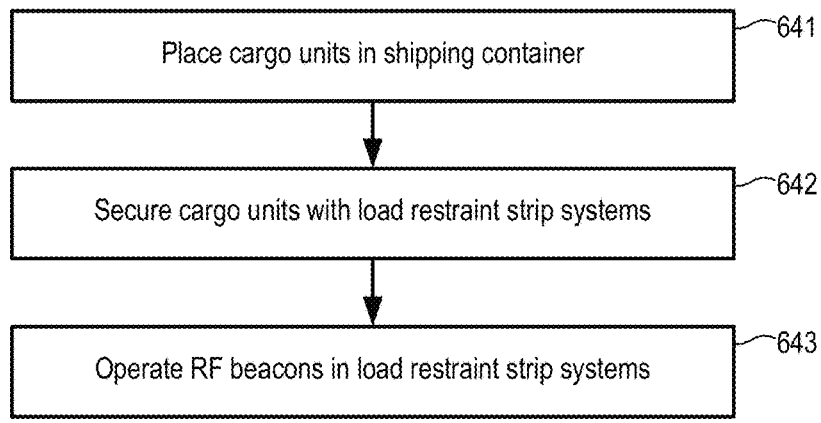

FIG. 25 is a flow chart showing steps in a method according to some embodiments. In step 641, a plurality of cargo units are placed in a shipping container. In step 642 the cargo units are secured with one or more load restraint strip systems. The load restraint strip systems may comprise load restraint strip systems 510 and/or load restraint strip systems 520. In step 643, the RF beacons of the cargo restraint panels operate according to methods similar to those described in connection with any of FIGS. 9 through 12, but with those methods modified to comprise RF beacons attached to components of load restraint strip systems instead of cargo restraint panels.

Figure 26:
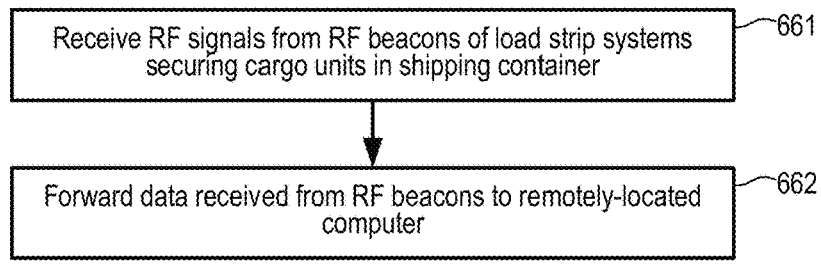

FIG. 26 is a flow chart showing steps in a further method according to some embodiments. The method of FIG. 26 may be performed by a system that includes a monitoring station (such as one of monitoring stations MS in FIGS. 12 and 13) and a computer remotely located from that monitoring station (such a server 411 of FIG. 12). The method of FIG. 26 may also be performed in conjunction with some or all steps of the method of FIG. 26. In step 661, while a shipping container holding a plurality of cargo units and a plurality of load restraint strip systems is at a particular location, a monitoring station receives RF signals from RF beacons of load restraint strip systems in a shipping container loaded with cargo units secured by those load restraint strip systems. As to each of those RF beacons, the RF signal received by the monitoring station comprises identification data. In some embodiments, the RF signal may also comprise other data such as one or more OOR indications. In step 662, the monitoring station forwards the data received from the RF beacons to the remotely-located computer.

In some embodiments, RF beacons attached to a cargo restraint component may be active RFID tags that operate according to one or more active RFID protocols. Such active RFID tags may operate according to an air interface standard such as, without limitation, one or more of the following: ISO/IEC 18000-7, ISO/IEC 18000-4, DASH7 (2nd gen of ISO 18000-7), IEEE 802.11n, and IEEE 802.15.4.

In some embodiments, an RF beacon attached to a cargo restraint component may operate in a transponder mode. In particular, and instead of (or in conjunction with) transmitting data at a repeating interval, an RF beacon in transponder mode may transmit data in response to receiving an interrogating signal from a monitoring station or other source. Such an interrogating signal could include, e.g., an identification code for that RF beacon and/or other code(s) to instruct the RF beacon to transmit information.

In some embodiments, a monitoring station may estimate a distance between that monitoring station and an RF beacon (and thus the cargo restraint component to which it is attached). The monitoring station may estimate that distance based on, e.g., a signal strength of the RF signal received from that RF beacon. In some embodiments, such an RF beacon may be configured to include, with identification code(s) and/or other transmitted data, an indicator of the transmit power level used by the RF beacon. A monitoring station receiving a signal that includes that transmit power level indicator could compare that power level to the strength of the signal as received and estimate distance based on the difference between transmit power level and received signal strength. The monitoring station could then report this estimated distance (e.g., to a computer such as server 411) with other data regarding the RF beacon. This information could be used for a variety of purposes. For example, a first distance R1 between a monitoring station and an RF beacon may indicate that the cargo restraint component to which that RF beacon is attached is located in a storage bin and has not yet been used to secure cargo. A second distance R2 between the monitoring station and that RF beacon may indicate that the cargo restraint component to which that RF beacon is attached has been placed into a shipping container parked at a loading platform.

In some embodiments, an RF beacon may log values for an environmental parameter over time and then transmit that log in response to a received command. For example, an RF beacon may measure temperature at defined intervals (e.g., every 5 minutes) and store each measured temperature value with the time that the temperature value was measured.

In some embodiments, an RF beacon may be connectable (e.g., via a short range wireless connection) to an external sensor in or on a shipping container. Such a beacon could then report OOR values of that external sensor and/or log values from that external sensor. One example of an external sensor to which such an RF beacon might be connected is a probe in a bottom of a container configured to detect water accumulation.

In some embodiments, an RF beacon may be programmable to store identification data regarding one or more cargo units secured by a cargo restraint component to which that RF beacon is attached. This additional data could transmitted by the RF beacon in addition to (or instead of) the RF beacon identification code(s) and used for tracking and/or other purposes.

In some embodiments, the specific position in a shipping container of each cargo restraint component having an attached RF beacon may be recorded. That position information, in conjunction with OOR indications and/or other data reported by the RF beacons of the cargo restraint components in that container, could then be used to identify cargo that may have been damaged. As but one example, assume that a railcar is used to ship perishable food products. Further assume that three RF beacons from cargo restraint components in a corner of a railcar transmit temperature OOR indications when the railcar arrives at its destination, but no RF beacons from cargo restraint components in other parts of the railcar indicate a temperature OOR occurred. In such a scenario, the cargo units in the railcar corner associated with the temperature OOR indications can be rejected as possibly spoiled, while the other cargo units in the railcar could be accepted.

FIGS. 27A through 37C show examples of other types cargo restraint components, according to some additional embodiments, that may also include an attached RF beacon 119. The RF beacons 119 in these additional embodiments may have any or all of the characteristics discussed in connection with the embodiments described in connection with FIGS. 1A through 26.

In one embodiment, a cargo restraint component 700 may comprise a fluid filled member 702, such as an air bag as shown in FIGS. 27A-27D, to provide cargo restraint and cushioning. Here, the cargo restraint component 700 may comprise a sealed membrane that can contain a fluid, such as air, or other gas or liquid. The fluid filled member 702 may have a front face 704 and a rear face 705 that are sealed along side edges 706-709. The fluid filled member 702 may be pressurized to have an internal pressure greater than the external air pressure or may have an internal pressure the same as the external air pressure. Additionally, the fluid filled member 702 may have a valve 710 to allow the air bag to be inflated for use or deflated to take up less room for storage.

Dimensionally, the inflated fluid filled member 702 may have an overall height, H1, length, L1, and depth, D1, similar to those described above with regards to cargo restraint panel 100. Since the fluid filled member 702 is sealed around the perimeter of the front face 704 and rear face 705, the fluid filled member 702 may have a central portion having a greater depth than at a top, bottom, or sides, where the depth is defined by dimension D1 as the maximum distance from the front face 704 to the rear face 705. The RF beacon 119 may be attached externally to any of the faces 704, 705. Alternatively, the RF beacon 119 may be attached internally to one of the faces 704, 705 of the fluid filled member 702. In embodiments where the RF beacon 119 is internally attached, one of the faces 704, 705 may have an opening (not shown) that has a cover with a reusable seal to access the RF beacon 119. Alternatively, a portion of a housing 123 of an internally-mounted RF beacon 119 may be sealed to and cover an opening in one of faces 704 or 705, with the housing 123 portion then forming a part of the barrier that prevents fluid escape from the fluid filled member.

Figure 27B:
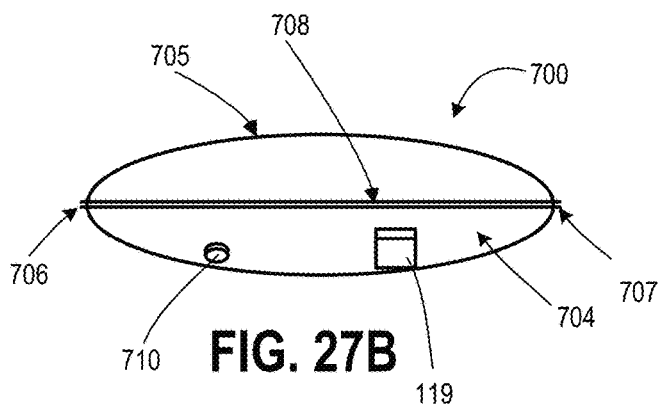
FIGS. 27A through 27C front, top edge, and side edge views, respectively, of a cargo restraint component according to some embodiments that comprises a fluid-filled member (an air bag).
Figure 27A:
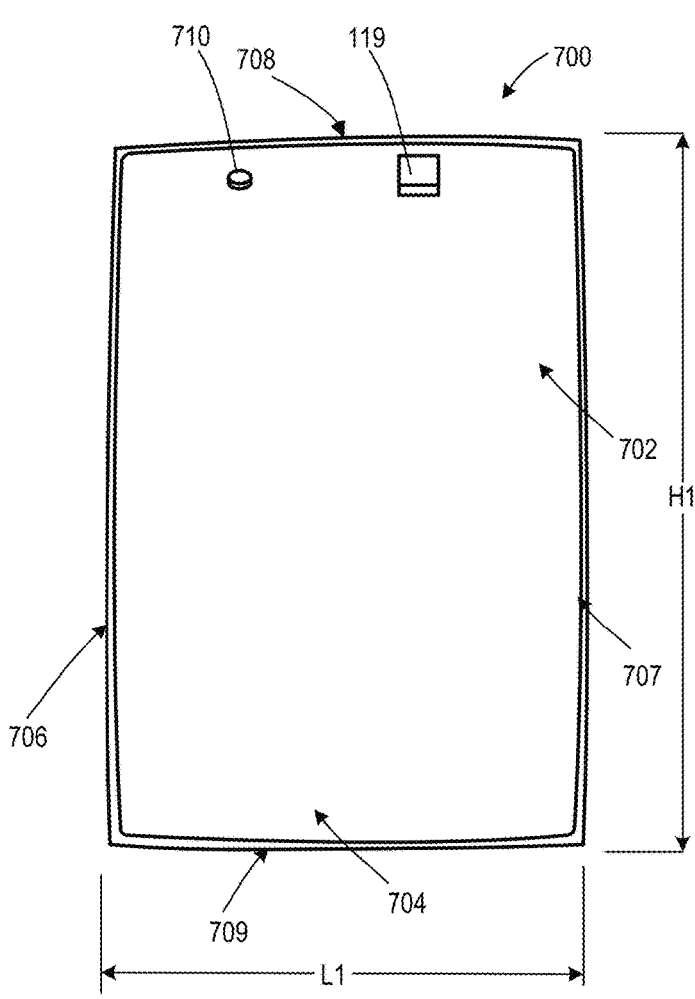
Figure 27C:
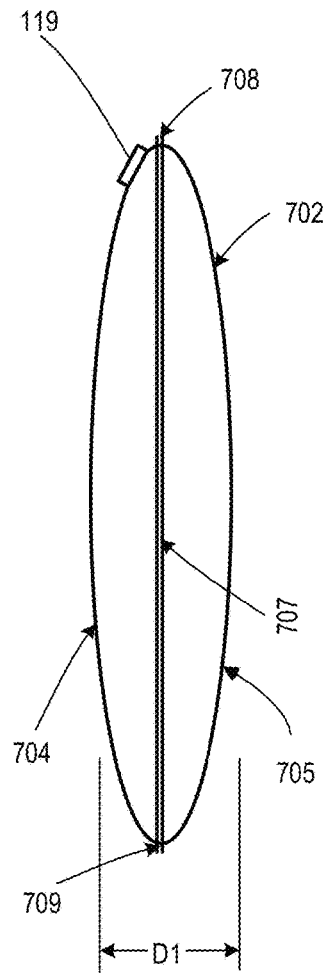
Figure 27D:
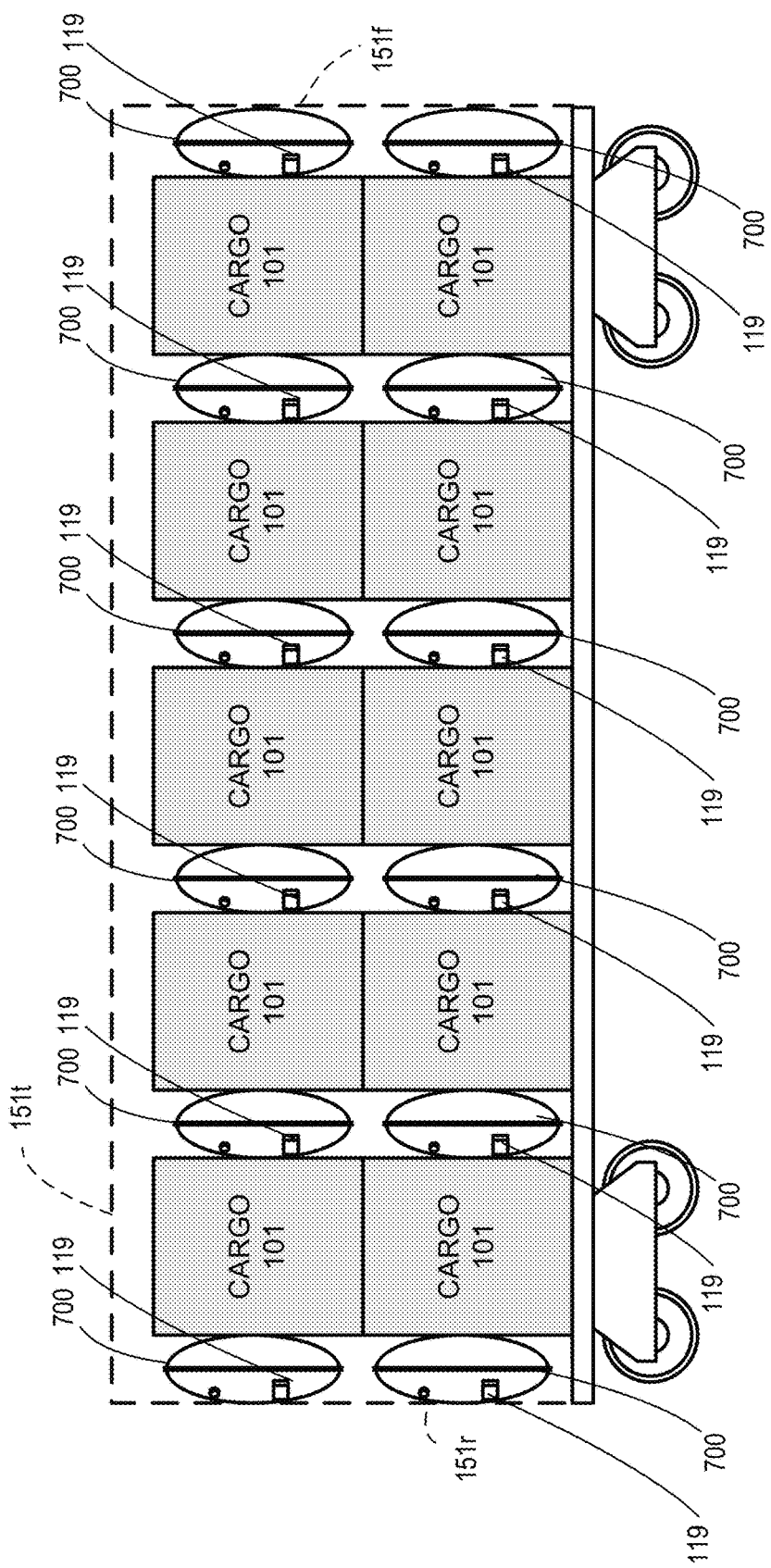
FIG. 27D is a side view of one example in which cargo restraint components such as that shown in FIGS. 27A through 27C have been used to restraint cargo.

FIG. 27D illustrates a side view of an example of the cargo restraint components 700 positioned between the cargo units 101 and between cargo units 101 and shipping container bulkheads 151f, 151r. The cargo restraint components 700 may cushion and prevent the cargo units 101 from shifting or moving during transit. While the exemplary embodiment illustrates the front face 704 and rear face 705 contacting the cargo units 101, the fluid filled member 702 may be positioned in other orientations between the cargo units 101.

Figure 28A:
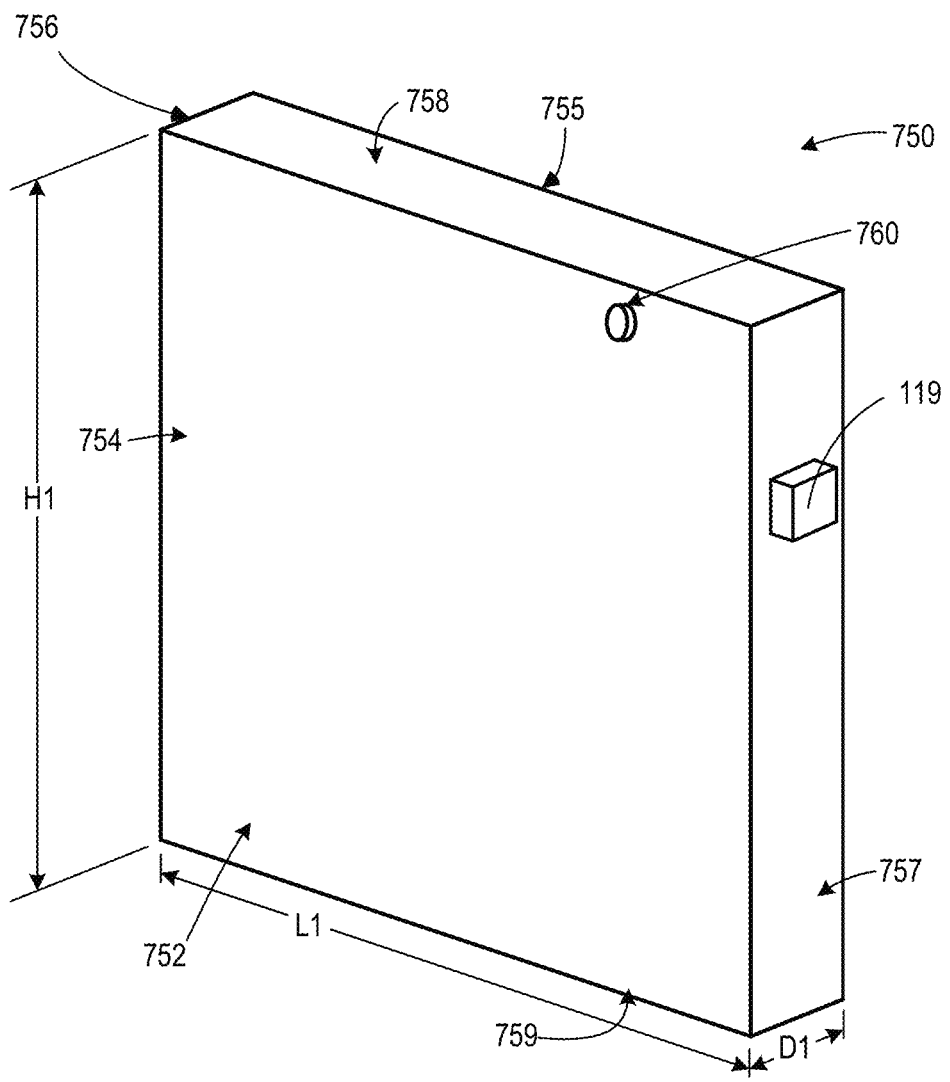
FIG. 28A is front perspective view of another embodiment of cargo a restraint component that comprises a fluid-filled member.
Figure 28B:
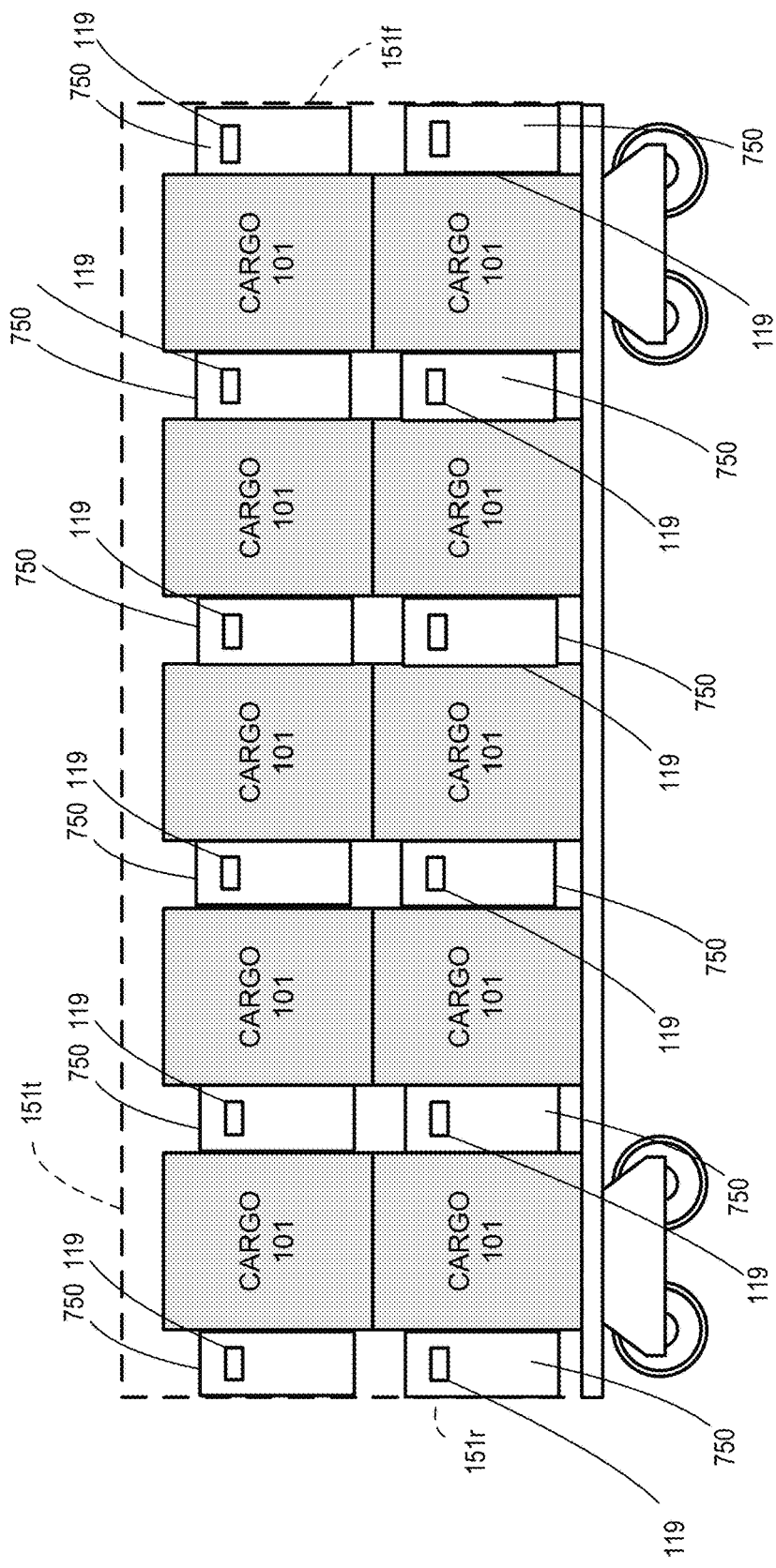
FIG. 28B is a side view of one example in which cargo restraint components such as that shown in FIG. 28A have been used to restraint cargo.

FIGS. 28A and 28B illustrate another embodiment of a cargo restraint component 750 comprising a fluid filled member or air bag 752. Here, the fluid filled member 752 may have a shape similar to a rectangular prism defined by an overall height, H1, length, L1, and depth, D1, similar to those described above with regards to cargo restraint panel 100. This more rectangular shape compared to the fluid filled member 702 may allow the cargo restraint component 750 to better fill the space between the cargo units. The fluid filled member 752 may have a front face 754, a rear face 755, side surfaces 756, 757, a top surface 758, and a bottom surface 759. The side surfaces 756, 757, the top surface 758, and the bottom surface 759 extend between the front face 754 and the rear face 755. The fluid filled member 752 may be pressurized to have an internal pressure greater than the external air pressure or may have an internal pressure the same as the external air pressure. Additionally, the fluid filled member 752 may have a valve 760 to allow the air bag to be inflated for use or deflated to take up less room for storage. In some embodiments, the valve 760 may be located on a side, top or bottom surface. The RF beacon 119 may be attached externally to any of the faces 754, 755, side surfaces 756, 757, top surface 758, or bottom surface 759. Alternatively, the RF beacon 119 may be attached internally to one of the sides of the fluid filled member 752 in a manner similar to that previously described.

FIG. 28B illustrates a side view of an example of the cargo restraint components 750 positioned between the cargo units 101 and between cargo units 101 and shipping container bulkheads 151f, 151r. The cargo restraint components 750 may cushion and prevent the cargo units 101 from shifting or moving during transit. While the exemplary embodiment illustrates the front face 754 and rear face 755 contacting the cargo units 101, the fluid filled member 752 may be positioned in other orientations between the cargo units 101.

Figure 29A:
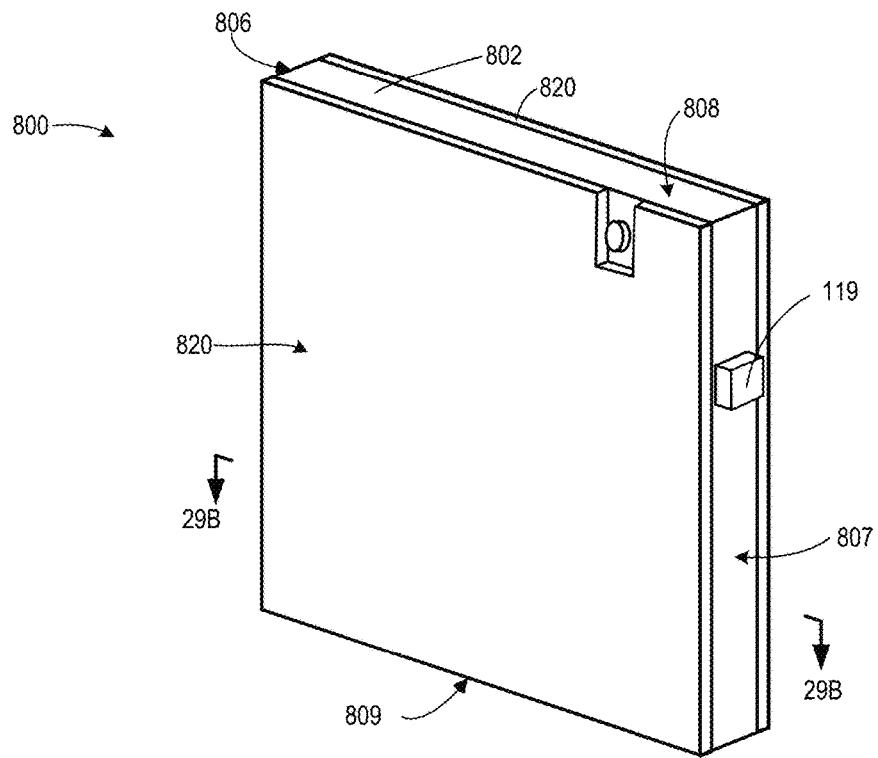
FIG. 29A is a front perspective view of a further embodiment of a cargo restraint component that comprises a fluid-filled member.
Figure 29B:
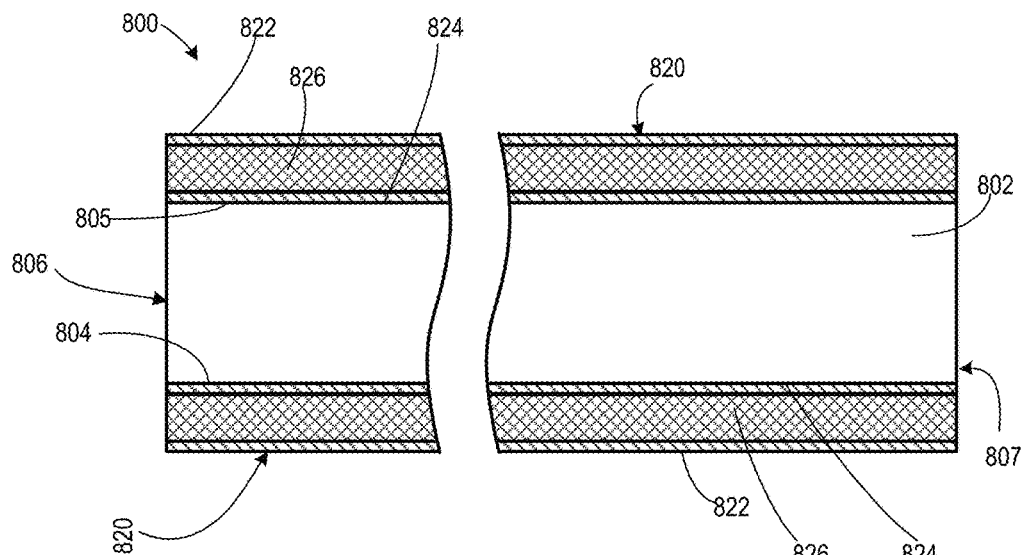
FIG. 29B is a partially schematic area cross-sectional view taken from a sectioning plane having the location indicated in FIG. 29A.
Figure 29C:
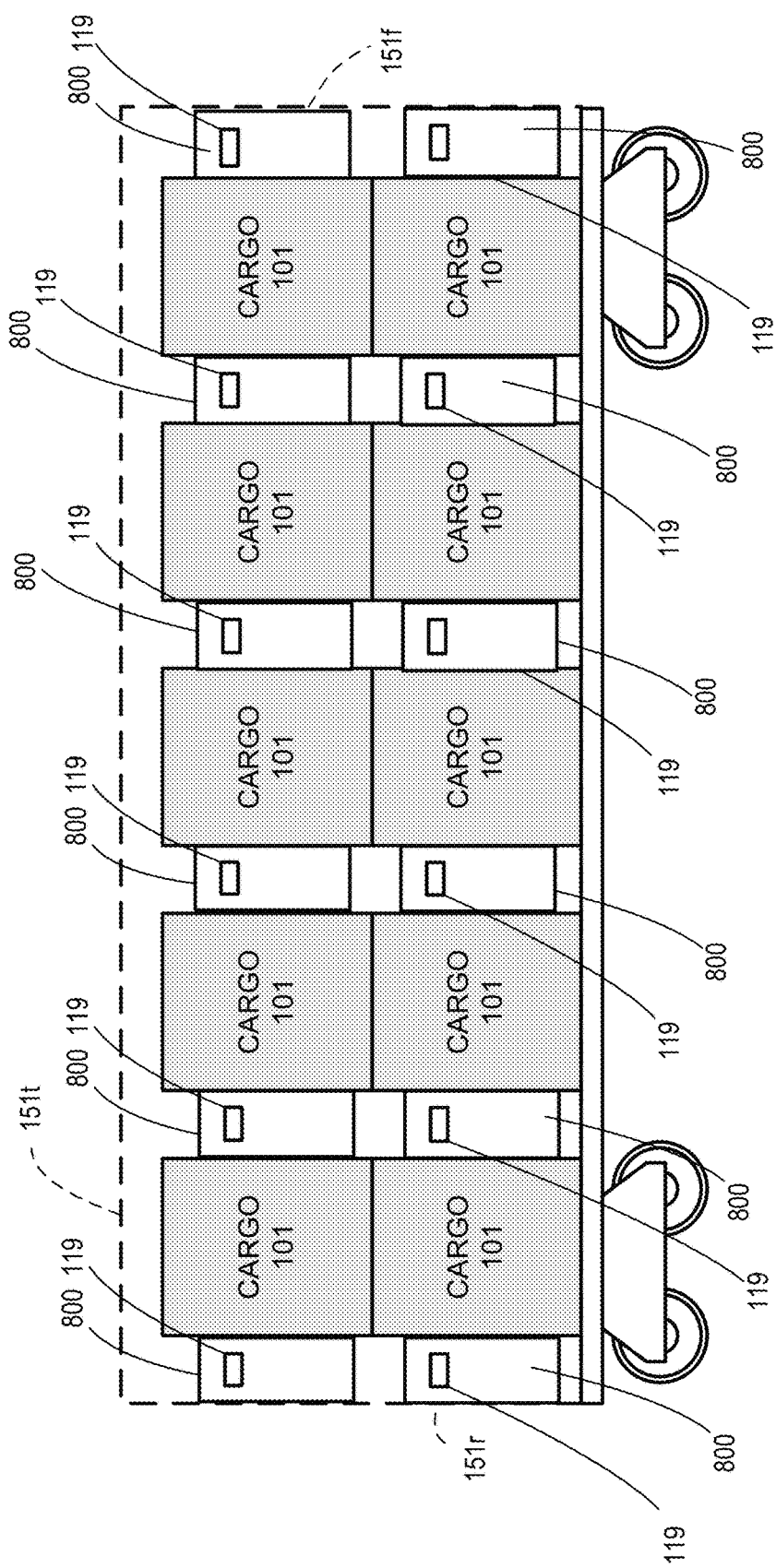
FIG. 29C is a side view of one example in which cargo restraint components such as that shown in FIGS. 29A and 29B have been used to restraint cargo.

FIGS. 29A to 29C illustrate a further embodiment of a cargo restraint component comprising a fluid filled member with a layered construction. FIG. 29A shows a cargo restraint component 800 having a fluid filled member 802, which is similar to fluid filled member 752 described above, and a facing sheet 820 attached to a front face 804 and/or a rear face 805 to provide additional rigidity and protection to the fluid filled member 802. In the exemplary embodiment shown in FIGS. 29A and 29B, a facing sheet 820 is attached to both the front and rear faces 804, 805 of the fluid filled member 802. The cargo restraint component 800 may have an overall height, H1, length, L1, and depth, D1, similar to those described above with regards to cargo restraint panel 100. In some embodiments a facing sheet 820 may be permanently bonded to a fluid filled member 802. As discussed above, a permanent bonding is a bonding in which the bonded elements cannot be separated without at least partially damaging or destroying one or both of the elements.

The facing sheet 820 may comprise a layered structure as shown in FIG. 29B similar to a cardboard honeycomb dunnage or corrugated cardboard dunnage known to one skilled in art. The facing sheet 820 may have a layered structure or sandwich construction as shown in FIG. 29B where the outer layer and inner layers 822, 824 are layers of non-corrugated cardboard or other type of solid material, while the central member 826 may be a honeycomb structure or as another option a wavelike or corrugated structure. For convenience, a simple cross-hatching pattern is used to indicate a honeycomb structure. Each cell of a honeycomb structure may have any shape, such as a hexagonal shape, a square shape, or a diamond shape. In the embodiment of FIGS. 29A and 29B, the honeycomb structure may be oriented so that the cell shapes would be visible if outer layer 822 were peeled away. The honeycomb structure may be formed from cardboard or from other types of material. Additionally, the size of the honeycombs may have any shape to create the desired weight and stiffness characteristics. The central member 826 may have a thickness that is greater than the thickness of the outer and inner layers. As one skilled in the art would understand, increasing the thickness of the central member 826 helps to increase the bending stiffness of the facing sheet 820. In some embodiments, a cargo restraint component 800 may have facing sheets 820 comprising a single layer of material. As an alternate embodiment, the facing sheets 820 may be formed from a fiber reinforced polymer material, or unfilled polymer material. The facing sheet 820 may have a cut out area around the valve 810 to allow an operator to inflate or deflate the air bag 802 accordingly. Valve 810 could alternately be located on the top, bottom or a side of air bag 802.

As shown, an RF beacon 119 may be attached to the side surface 807 of the fluid filled member 802. However, the RF beacon 119 may be attached to either of the facing sheets 820, externally to any of the faces 804, 805, top surface 808, bottom surface 809 or side surface 806 of the fluid filled member 802. As another option, the RF beacon 119 may be attached internally to the fluid filled member 802 in a manner similar to that described above.

Although cargo restraint component 800 has facing sheets 820 applied to two faces 804, 805 of the fluid filled member 802, embodiments may include cargo restraint components 800 having facing sheets 820 on fewer, more, or all faces of the fluid filled member 802. For example, facing sheets 820 may be applied to one or more of side surfaces 806, 807, or the top and bottom surfaces 808, 809 in a manner similar to the manner in which the facing sheet 820 is applied to front face 804 and rear face 805.

FIG. 29C illustrates a side view of an example of the cargo restraint components 800 positioned between the cargo units 101 and between cargo units 101 and shipping container bulkheads 151f, 151r. The cargo restraint components 800 may cushion and prevent the cargo units 101 from shifting or moving during transit. While the exemplary embodiment illustrates the facing sheets 820 attached to the front face 804 and rear face 805 of the fluid filled member 802 contacting the cargo units 101, the cargo restraint component 800 may be positioned in other orientations between the cargo units 101.

The fluid filled members 702, 752, and 802 may be fabricated from membranes formed from a polymer based material and/or may include a woven material to make them more durable.

Figure 30A:
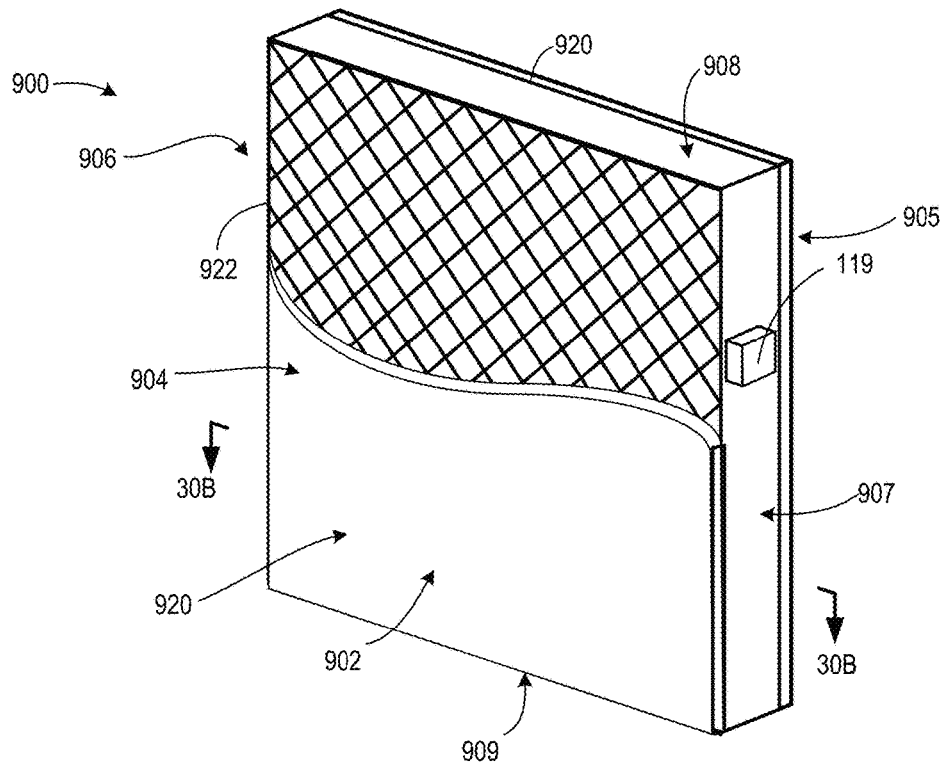
FIG. 30A is a front perspective view of an embodiment of a cargo restraint component that comprises a honeycomb central member.
Figure 30B:
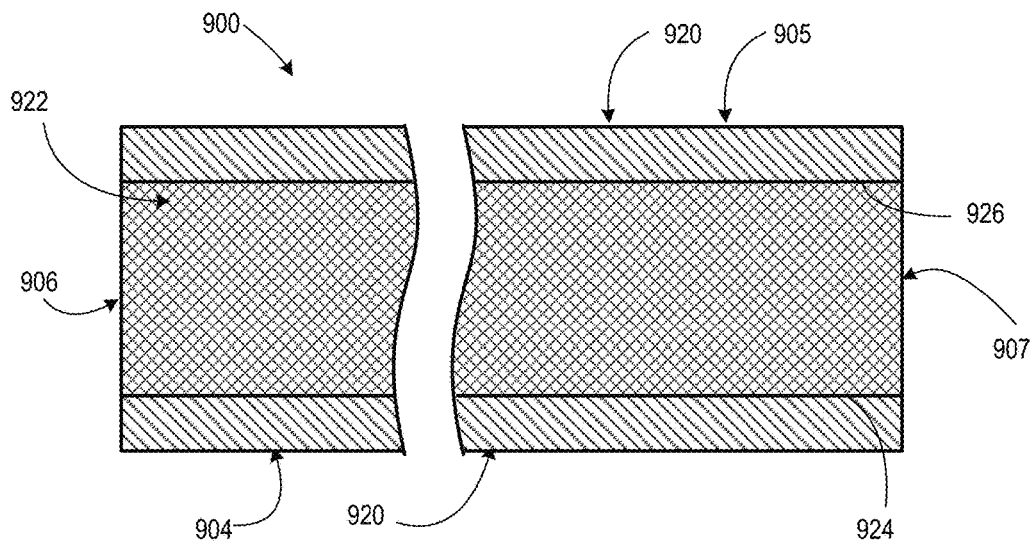
FIG. 30B is a partially schematic area cross-sectional view taken from a sectioning plane having the location indicated in FIG. 30A.
Figure 30C:
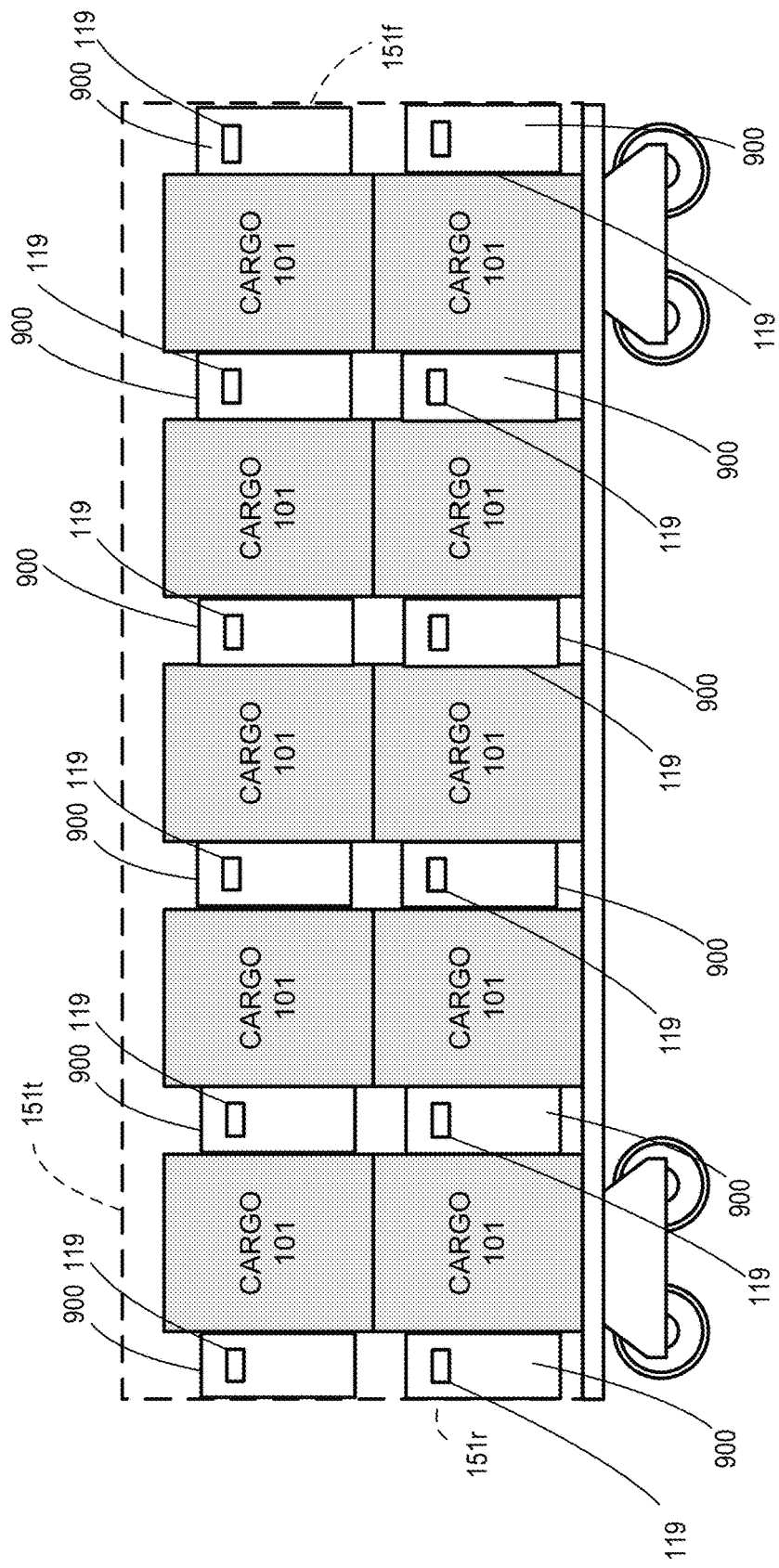
FIG. 30C is a side view of one example in which cargo restraint components such as that shown in FIGS. 30A and 30B have been used to restraint cargo.

In an embodiment shown in FIGS. 30A to 30C, a cargo restraint component 900 may comprise a layered or sandwich structure 902, where the cargo restraint component 900 comprises multiple layers of materials to create the desired weight and stiffness. The layered structure 902 may comprise outer facing sheets 920 attached to a central member 922. The cargo restraint component 900 may have a front face 904, a rear face 905, side surfaces 906, 907 extending between the front face 904 and rear face 905, along with top and bottom surfaces 908, 909 respectively. In addition, the central member 922 may have a front surface 924 and a rear surface 926 that are permanently bonded to the outer facing sheets 920. The layered structure 902 may have sandwich construction where the facing sheets 920 may be a layer of cardboard or other solid material, while the central member 922 may have a honeycomb structure. In the embodiment of FIGS. 30A and 30B, the honeycomb structure may be oriented so that the cell shapes would be visible if outer facing sheet 920 were peeled away, as is partially shown in FIG. 30A. The honeycomb structure may be formed from cardboard or from other types of material. Each honeycomb of the honeycomb structure may have any shape, such as a hexagonal shape, a square shape, or a diamond shape (as shown in FIG. 30A). Additionally, the size of the honeycombs may have any shape to create the desired weight and stiffness characteristics. The layered structure 902 may be cardboard honeycomb dunnage as known to one skilled in the art. The central member 922 may have a thickness that is greater than the thickness of the outer and inner layers. In some embodiments, the facing sheets 920 may comprise a single layer of material. As an alternate to the cardboard, the facing sheets 920 along with the central member 922 may be formed from materials such as wood, fiber reinforced polymer material, or unfilled polymer material. As another option, the central member 922 may have a wavelike or corrugated structure.

The RF beacon 119 may be attached to the central member 922 as shown in FIG. 30A. The RF beacon 119 may be attached directly to the honeycomb portion of the central member 922, attached to a secondary facing sheet (not shown) bonded to the central member 922, or attached to a pocket (not shown) formed within the central member. Alternatively, the RF beacon may be attached externally or internally to either of the facing sheets 920.

Although the exemplary cargo restraint component 900 in FIGS. 30A to 30C has facing sheets 920 on two faces 904, 905 of the cargo restraint component 900, embodiments may include cargo restraint components 900 having facing sheets 920 on fewer, more, or all faces of the central member 922. For example, a facing sheet 920 may be applied to one or more of side surfaces 906, 907, or the top and bottom surfaces 908, 909 in a manner similar to the manner in which the facing sheet 920 is applied to front face 904 and rear face 905. While the exemplary embodiment illustrates the facing sheets 920 are solid layers of material, the facing sheets 920 may also have a similar layered structure with a thickness that is less than the thickness of the central member 922. In addition, some embodiments of the cargo restraint component 900 may comprise different types of facing sheets 920 applied to different locations, where one region may have a single layer and other regions may have a layered structure.

FIG. 30C illustrates a side view of an example of the cargo restraint components 900 positioned between the cargo units 101 and between cargo units 101 and shipping container bulkheads 151*f*, 151*r*. The cargo restraint components 900 may cushion and prevent the cargo units 101 from shifting or moving during transit. While the exemplary embodiment illustrates the front face 904 and rear face 905 contacting the cargo units 101, the cargo restraint component 900 may be positioned in other orientations between the cargo units 101.

Figure 35:
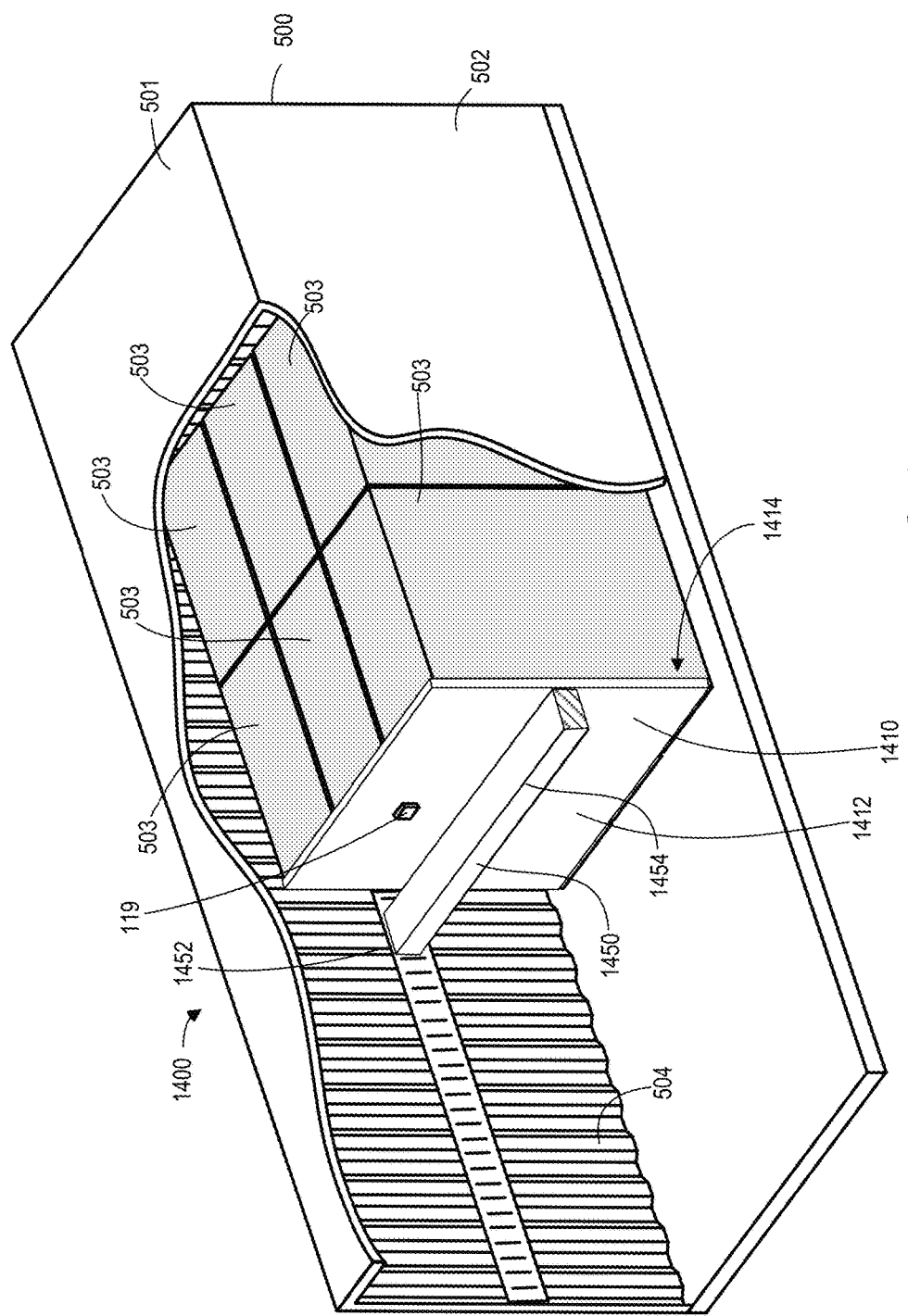
FIG. 35 is a perspective view showing another embodiment of a cargo restraint component that comprises a portable bulkhead.
Figure 36:
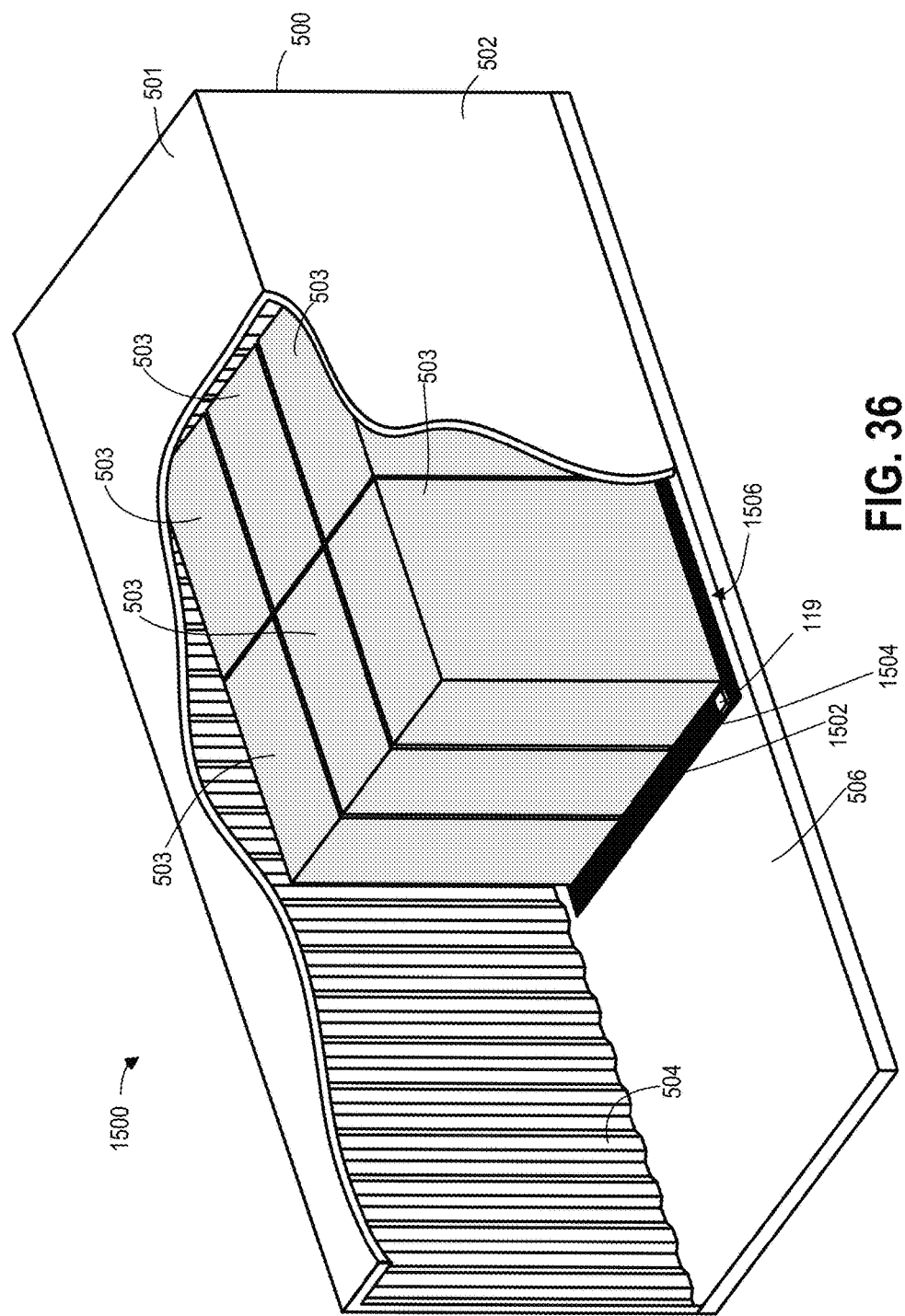
FIG. 36 is a perspective view showing an embodiment of a cargo restraint component that comprises a non-skid mat.
Figure 37C:
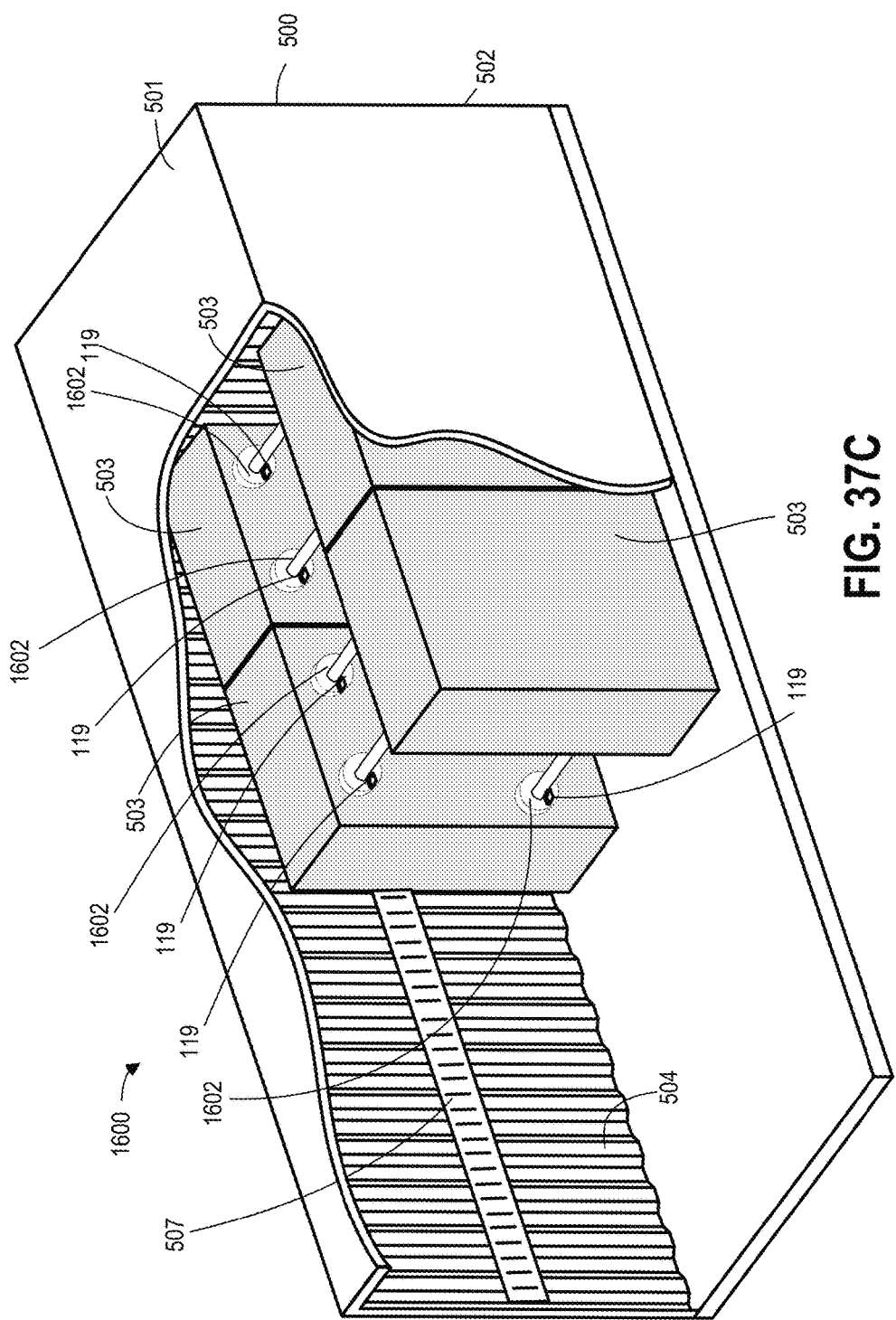
FIG. 37C is a perspective view showing one example in which cargo restraint components such as that shown in FIGS. 37A and 37B have been used to restraint cargo.

FIGS. 31 through 36 along with FIG. 37C illustrate perspective views of additional cargo restraint components. Shown in these figures is a shipping container 500 in which portions of a top 501 and right side wall 502 have been cut away. In the examples FIGS. 31-36 and 37C, shipping container 500 is an intermodal transport container similar to that of FIGS. 14 and 15, but the cargo restraint components illustrated in these figures may be used with other types of shipping containers.

Figure 31:
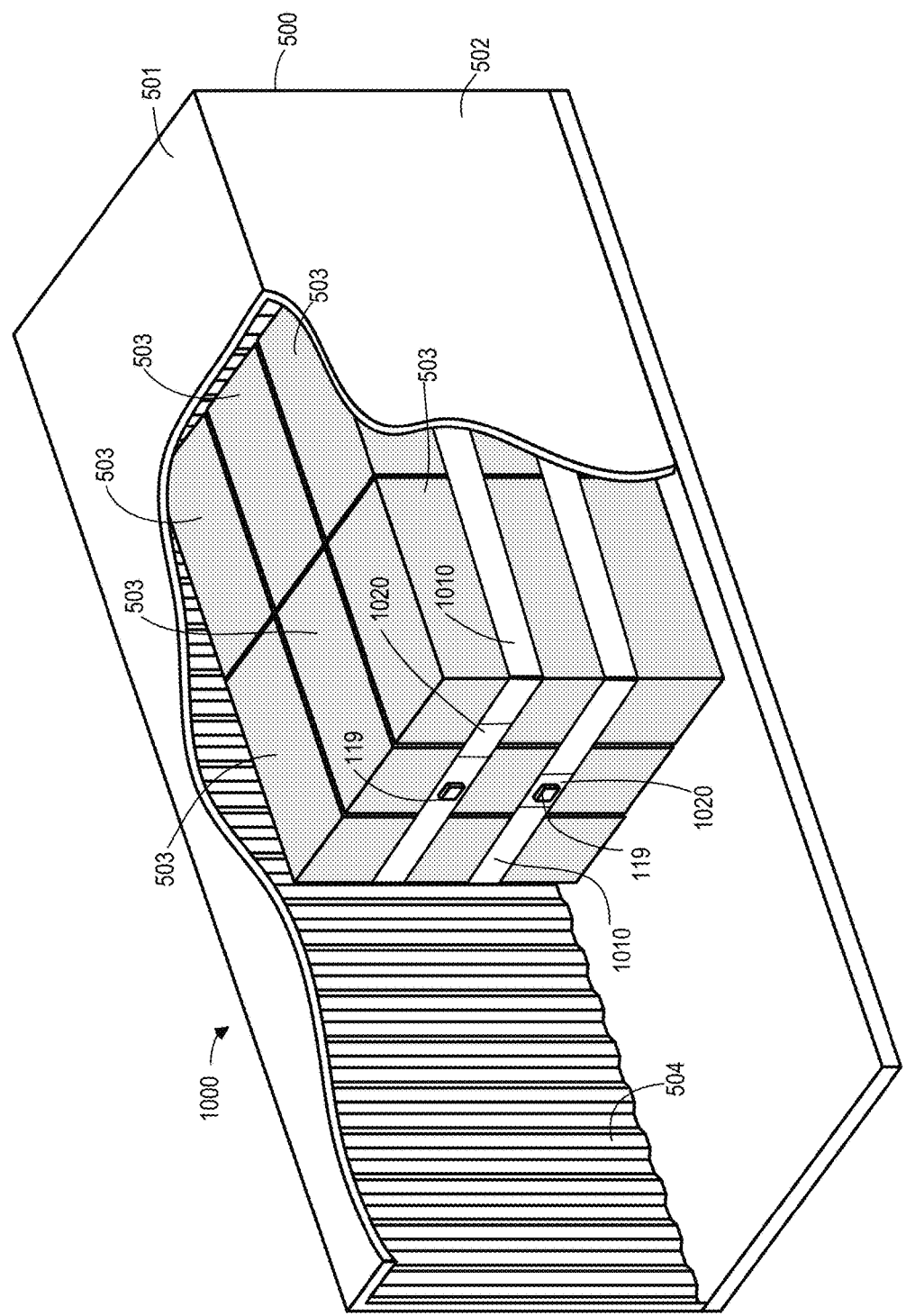
FIG. 31 is a perspective view showing embodiments of cargo restraint components that comprise cargo restraint straps.

FIG. 31 is a perspective view showing a cargo restraint component 1000, according to some embodiments, in which RF beacons are attached to a retaining strap or banding system. As shown in FIG. 31, the strap 1010 may be wrapped around the cargo units 503 to secure the cargo units 503 to each other to keep them from undesired movement. Each strap 1010 may have a buckle element 1020 to constrain and tighten the strap 1010 or band around the cargo units 503. Multiple straps 1010 may be used to fully secure the cargo units 503 such as shown in FIG. 31. The RF beacon 119 may be externally attached to the strap 1010 or may be attached to a portion of the buckle element 1020. The retaining straps may be formed from a woven fabric, a polymer based material, a paper based material, or some combination thereof as known to one skilled in the art to provide the required strength and flexibility.

Figure 32:
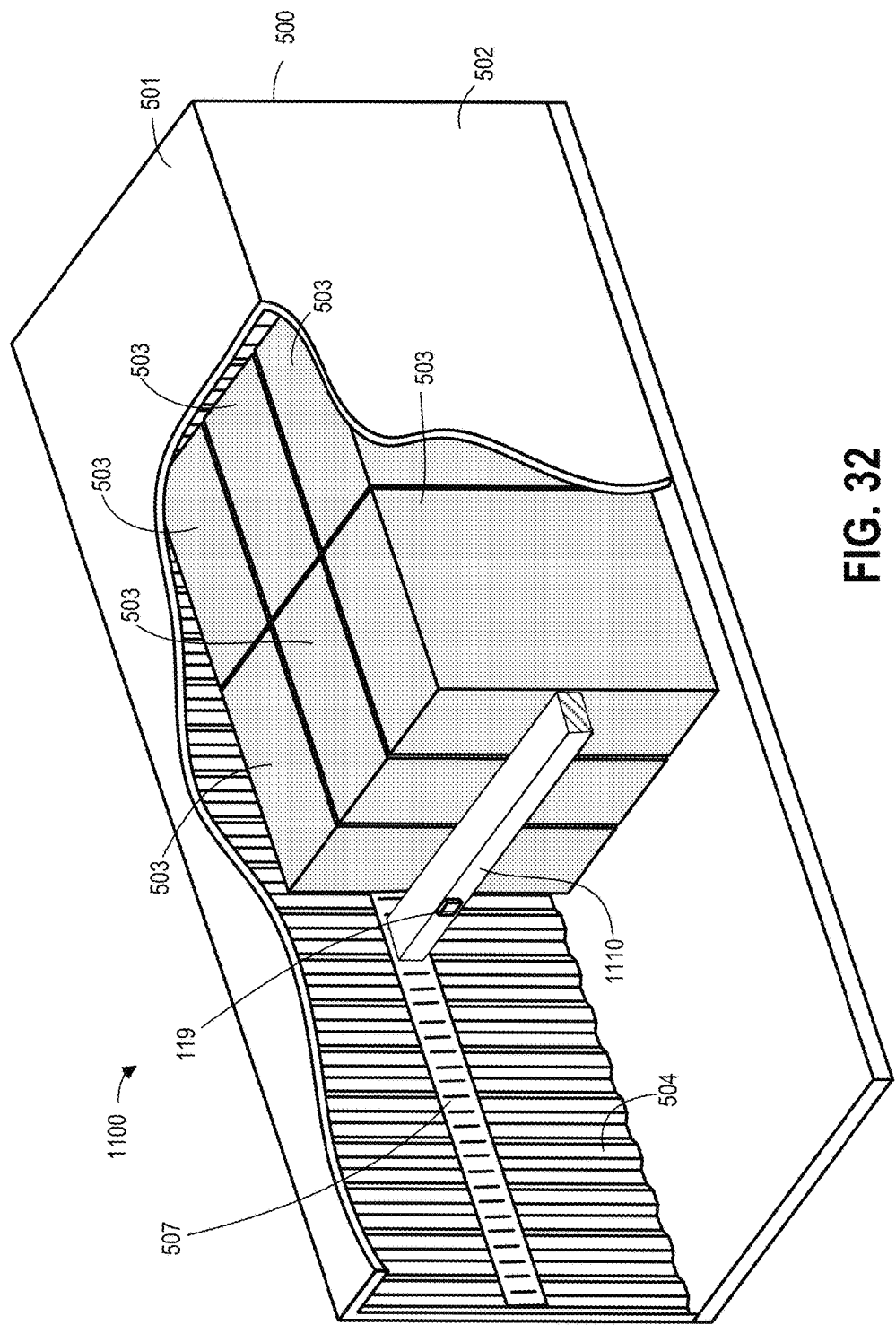
FIG. 32 is a perspective view showing an embodiment of a cargo restraint component that comprises a cargo bracing member.

In another embodiment, a cargo restraint component may comprise a portable bracing system 1100 shown in FIG. 32. The portable bracing system 1100 shown in FIG. 32 may comprise a support beam 1110 that may be selectively mounted at any of multiple locations along an internal railing 507 attached to an interior of side wall 504. The support beam 1110 may extend from the internal railing 507 on the interior of side wall 504 to a similar the internal railing, not shown, on the interior of side wall 502 of the container 500. The support beam 1110 may restrain the cargo units 503 to help prevent any undesired movement. The RF beacon 119 may be externally located on the support beam 1110, as shown, or may be mounted internal to the support beam 1110. The support beam 1110 may be formed from, e.g., one or more wood, polymer, metallic or other materials. In some embodiments, a support beam such as support beam 1110 may be oriented vertically and extend between railings on the floor and ceiling of a cargo container.

Figure 33:
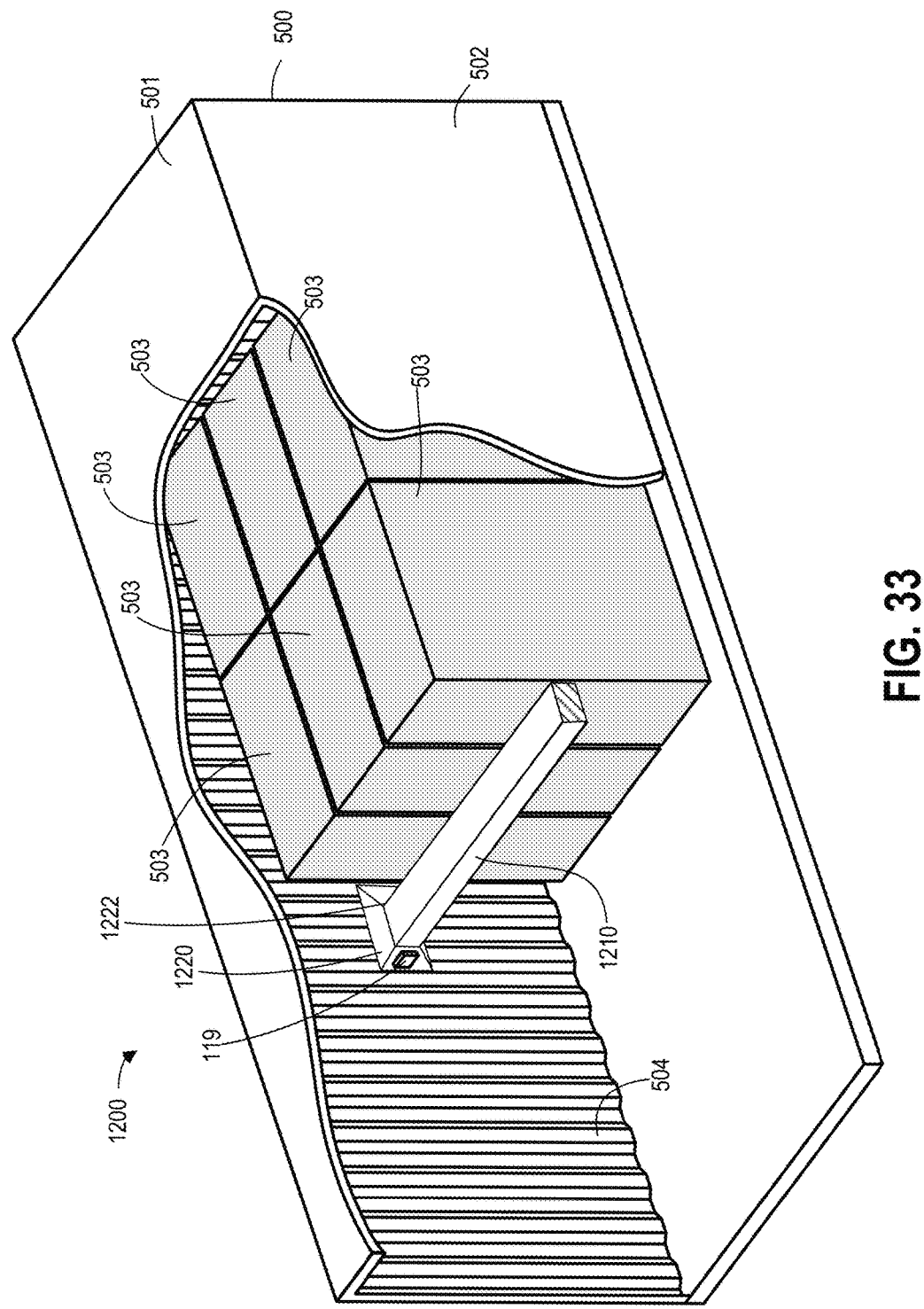
FIG. 33 is a perspective view showing another embodiment of a cargo restraint component that comprises a cargo bracing member.

Another embodiment of a cargo restraint component that may comprise a portable bracing system 1200 is shown in FIG. 33. The portable bracing system 1200 may have a plurality of mounting brackets 1220 that releasably attach to the interior of the side walls 502, 504 of the container 500 and a support beam 1210 that extends between the plurality of mounting brackets 1220. Each bracket 1220 may have an opening 1222 to receive each end of the beam 1220. In addition, a resilient member (not shown) may be installed within each opening 1222 to keep the beam 1210 secure between the mounting brackets 1220. Each bracket 1220 may be releasably attached to the interior walls 502, 504 of the container 500 using an adhesive or double sided tape. The RF beacon 119 may be externally attached to the mounting bracket 1220, as shown, or alternatively may be internally located within the mounting bracket 1220. As another option, the RF beacon 119 may be externally located on the support beam 1210. The mounting brackets 1220 and the support beam 1210 beam may be formed of a one or more polymer, wood, metallic, or other materials. In some embodiments, a support beam such as support beam 1210 may be oriented vertically and extend between mounting brackets 1220 attached to the floor and ceiling of a cargo container.

Figure 34:
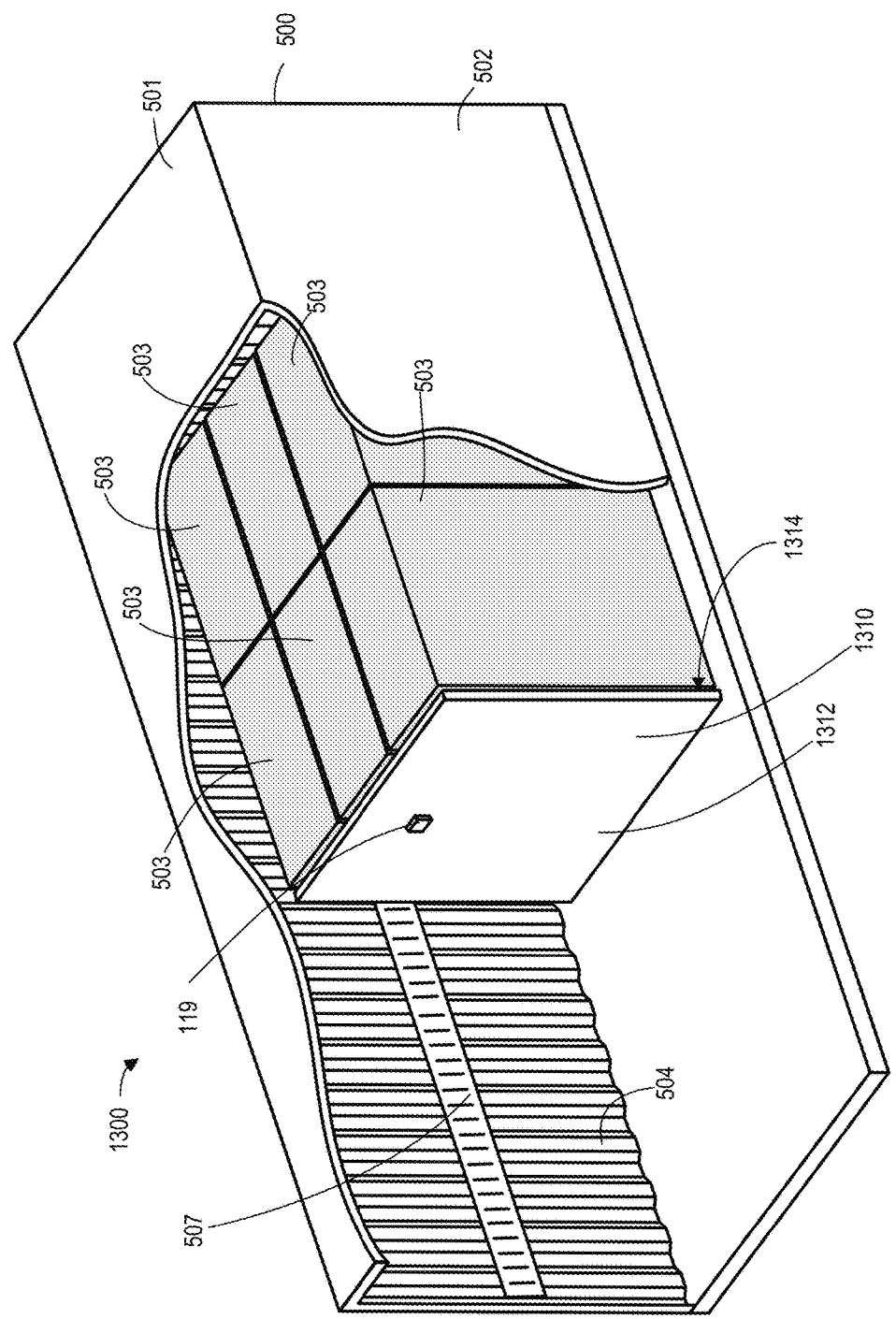
FIG. 34 is a perspective view showing an embodiment of a cargo restraint component that comprises a portable bulkhead.

FIG. 34 illustrates an embodiment of a cargo restraint component comprising a movable or portable bulkhead system 1300. Here, the portable bulkhead system 1300 may comprise a retaining wall 1310 which releasably mounts to any of multiple locations on the inner railings 507 mounted to opposing interior sides of the walls 502, 504 of the shipping container 500 to separate and secure the cargo units 503. In other embodiments, a retaining wall may also or alternatively be secured to railings or other fixtures positioned on a floor and/or ceiling of a shipping container. The retaining wall 1310 may have a front surface 1312 and a rear surface 1314 opposite the front surface 1312 that faces the cargo units 503. Further, the retaining wall 1310 may extend across a majority of a height defined as a distance from the interior of top and bottom surfaces of the shipping container 500 and a majority of a width defined as a distance from the interior surfaces of the walls 502, 504 of the shipping container 500. The retaining wall 1310 may have a plurality of anchors to attach to the interior sides of the container 500. The RF beacon 119 may be attached to the exterior surface of the retaining wall 1310 such as the front surface 1312 (as shown), or may be internally mounted within retaining wall 1310. The retaining wall 1310 may be formed from one or more of cardboard, wood, fiber reinforced polymer, unfilled polymer, or metallic material, or other type of material.

FIG. 35 illustrates another embodiment of a cargo restraint component comprising a movable or portable bulkhead system 1400. Here, the portable bulkhead system 1400 may comprise a retaining wall 1410 which releasably mounts to the interior of the walls 502, 504 shipping container 500 to separate and secure the cargo units 503. The retaining wall 1410 may have a front surface 1412, a rear surface 1414 opposite the front surface 1412 that faces the cargo units 503. Further, the retaining wall 1410 may extend across a majority of a height defined as a distance from the interior of top and bottom surfaces of the shipping container 500 and a majority of a width defined as a distance from the interior surfaces of the walls 502, 504 of the shipping container 500. The retaining wall 1410 may be secured in place by one or more bracing members 1450. The bracing member 1450 may comprise a support beam 1452 extending from the first interior wall 502 of the shipping container 500 to the second interior wall 504 of the shipping container 500.

The RF beacon 119 may be attached to the exterior surface of the retaining wall 1410 such as the front surface 1412, or may be internally mounted. The retaining wall 1410 and the support beam 1450 be formed from materials similar to those described in connection with retaining walls and support beams of other embodiments.

FIG. 36 illustrates an embodiment of a cargo restraint component 1500 comprising a non-skid mat 1502. The non-skid mat 1502 may be placed between the cargo units 503 and the floor 506 of the container 500. The non-skid mat 1502 may be formed of a rubber or other elastomeric polymer, a rubber or other elastomeric polymer with fiber reinforcing, a woven or non-woven fiber sheet coated with rubber or other elastomeric polymer, or other high friction material, and may be used to increase the friction between the cargo units 503 and the floor 506 of the container 506. Further, the top surface 1504 and the bottom surface 1506 may have a texture to help increase the friction when the cargo units are placed on top of the non-skid mat 1502. The non-skid mat 1502 may have a size to extend across the width of the interior of the container 500. Alternatively, a cargo restraint component 1500 may have a smaller size, with a plurality of smaller non-skid mats 1502 then placed next to each other, either adjacent each other or spaced apart from each other, when used with larger loads. Exemplary dimensions for a square non-skid mat include, without limitation, a 2 foot by 2 foot mat, a 3 foot by 3 foot mat, a 4 foot by 4 foot mat, and a 5 foot by 5 foot mat. Embodiments also include mats having shapes other than square. Exemplary thicknesses for a mat may range from, without limitation, 0.25 inches to 1 inch. The RF beacon 119 may be placed externally on the top surface 1504 of the non-skid mat 1502.

FIGS. 37A and 37B illustrate another embodiment of a cargo restraint component 1600 that comprises an expandable load stabilizer 1602. The expandable load stabilizer 1602 comprises a first base plate 1604, a second base plate 1606 spaced from the first base plate 1604, and an expandable beam or rod 1608 extending between the first and second base plates 1604, 1606. The expandable beam 1608 may comprise a first rotating member 1608A and a second rotating member 1608B that rotate relative to one another to expand or contract the distance between the outer portions of the base plates 1604, 1606. By adjusting the distance between the outer portions of the base plates 1604, 1606, the stabilizer 1602 can be adjusted to fit between different sized cargo units. FIG. 37B illustrates a plurality of expandable load stabilizers 1602 installed between cargo units 503. One type of expandable load stabilizer, without an attached RF beacon, is described in more detail in U.S. Pat. Nos. 7,322,781 and 7,604,443, which are hereby incorporated by reference in their entirety. An RF beacon 119 may be attached to either of the base plates 1604, 1606 or even along the expandable beam 1608.

As multiple cargo restraint components have been described herein, one skilled in the art may choose to combine one or more of the cargo restraint components having RF beacons 119 to restrain cargo units in a shipping container.

Cargo restraint components such as are described in connection with FIGS. 27A through 37C may be used in methods similar methods in which cargo restraint components described in connection with earlier figures may be used. For example, and without limitation, methods similar to methods described in connection with the flow charts of FIGS. 9-11 and 23-36 and/or in connection with the block diagram of FIG. 12 may be performed using any (or a combination of any) of the types of cargo restraint components described in connection with FIGS. 27A through 37C.

Embodiments include without limitation, cargo restraint components such as are described herein, methods of using cargo restraint components such as are described herein, and systems that comprise one or more cargo restraint components such as are described herein.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising:
   placing a plurality of cargo units into a shipping container;
   placing a plurality cargo restraint components in the shipping container;
   wherein each of the cargo restraint components comprises an air bag;
   wherein, after placement of the cargo units and the cargo restraint components in the shipping container, the cargo units are restrained by the plurality of the cargo restraint components; and
   wherein each of the cargo restraint components comprises an attached radio frequency (RF) beacon;
   determining, by a first RF beacon attached to one of the cargo restraint components, and based on a measured value of an environmental parameter being outside of an allowable range, an out-of-range condition, wherein the allowable range is defined by one or more threshold values, and wherein the environmental parameter comprises acceleration, temperature, or humidity; and
   outputting, by the first RF beacon and based on the determining, a signal comprising data indicating the out-of-range condition and an identification associated with the first RF beacon.

2. The method of claim 1, wherein the shipping container is a railcar.

3. The method of claim 1, wherein each of the attached RF beacons comprises a battery.

4. The method of claim 1, wherein each of the attached RF beacons comprises a processor, an RF transmitter, and memory storing machine executable instructions that, when executed by the processor, cause the processor to perform steps that comprise
   transmitting one or more identification codes using the RF transmitter.

5. The method of claim 1, wherein each of the cargo restraint components further comprises a facing sheet attached to at least one of a front face or a rear face of the air bag, wherein the facing sheet comprises a layered structure.

6. The method of claim 5, wherein each of the cargo restraint components further comprises a facing sheet attached to both the front face and the rear face.

7. The method of claim 1, wherein each of the cargo restraint components comprises a layered structure comprising a central member having at least one facing sheet attached to the central member.

8. The method of claim 7, wherein the central member is a honeycomb structure.

9. The method of claim 7, wherein the central member is made of a corrugated structure.

10. The method of claim 9, wherein the layered structure is cardboard honeycomb dunnage.

11. The method of claim 1, further comprising:
placing a plurality of additional cargo units into the shipping container; and
placing an additional cargo restraint component in the shipping container, wherein the additional cargo restraint component comprises a retaining strap and a buckle member, wherein the retaining strap is positioned around at least a portion of the plurality of additional cargo units and the buckle member connects and constrains the retaining strap, and wherein an RF beacon is attached to the retaining strap.

12. The method of claim 1, further comprising:
placing a plurality of additional cargo units into the shipping container; and
placing an additional cargo restraint component in the shipping container, wherein the additional cargo restraint component comprises a retaining strap and a buckle member, wherein the retaining strap is positioned around at least a portion of the plurality of additional cargo units and the buckle member connects and constrains the retaining strap, and wherein an RF beacon is attached to the buckle member.

13. The method of claim 1, further comprising:
placing a plurality of additional cargo units into the shipping container; and
placing an additional cargo restraint component in the shipping container, wherein the additional cargo restraint component comprises a portable bracing system support beam that extends from a first interior wall of the shipping container to a second interior wall of the shipping container opposite the first interior wall, and wherein an RF beacon is attached to the support beam.

14. The method of claim 1, further comprising:
placing a plurality of additional cargo units into the shipping container; and
placing an additional cargo restraint component in the shipping container, wherein the additional cargo restraint component comprises a portable bracing system support beam mounting bracket and a support beam connected to the mounting bracket, and wherein an RF beacon is attached to the mounting bracket.

15. The method of claim 1, further comprising:
placing a plurality of additional cargo units into the shipping container; and
placing an additional cargo restraint component in the shipping container, wherein the additional cargo restraint component comprises a portable bulkhead system retaining wall extending across the shipping container, and wherein an RF beacon is attached to the retaining wall.

16. The method of claim 1, further comprising:
placing a plurality of additional cargo units into the shipping container; and
placing an additional cargo restraint component in the shipping container, wherein the additional cargo restraint component comprises a non-skid mat, and wherein an RF beacon is attached to the non-skid mat.

17. The method of claim 1, further comprising:
placing a plurality of additional cargo units into the shipping container; and
placing an additional cargo restraint component in the shipping container, wherein the additional cargo restraint component comprises an expandable load stabilizer having a first base plate, a second base plate and an expandable beam positioned between the first base plate and the second base plate, and wherein an RF beacon is attached to the first base plate, the second base plate, or the expandable beam.

* * * * *